Figure 34:
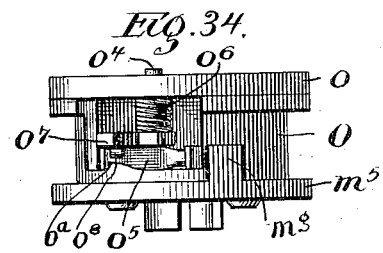

No. 819,952. PATENTED MAY 8, 1906.
R. R. THOMPSON.
MATTRESS TUFTING MACHINE.
APPLICATION FILED SEPT. 24, 1900.
18 SHEETS—SHEET 1.
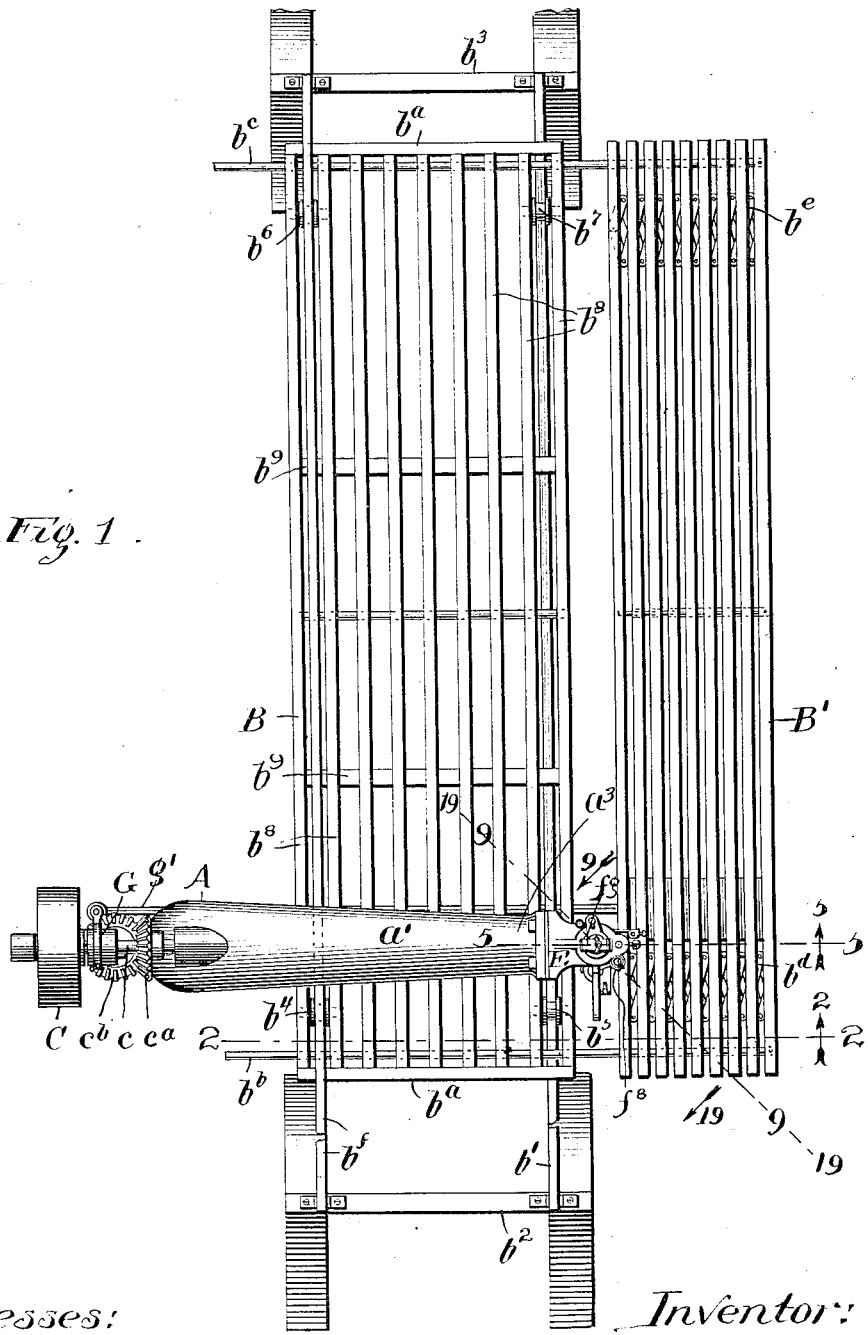

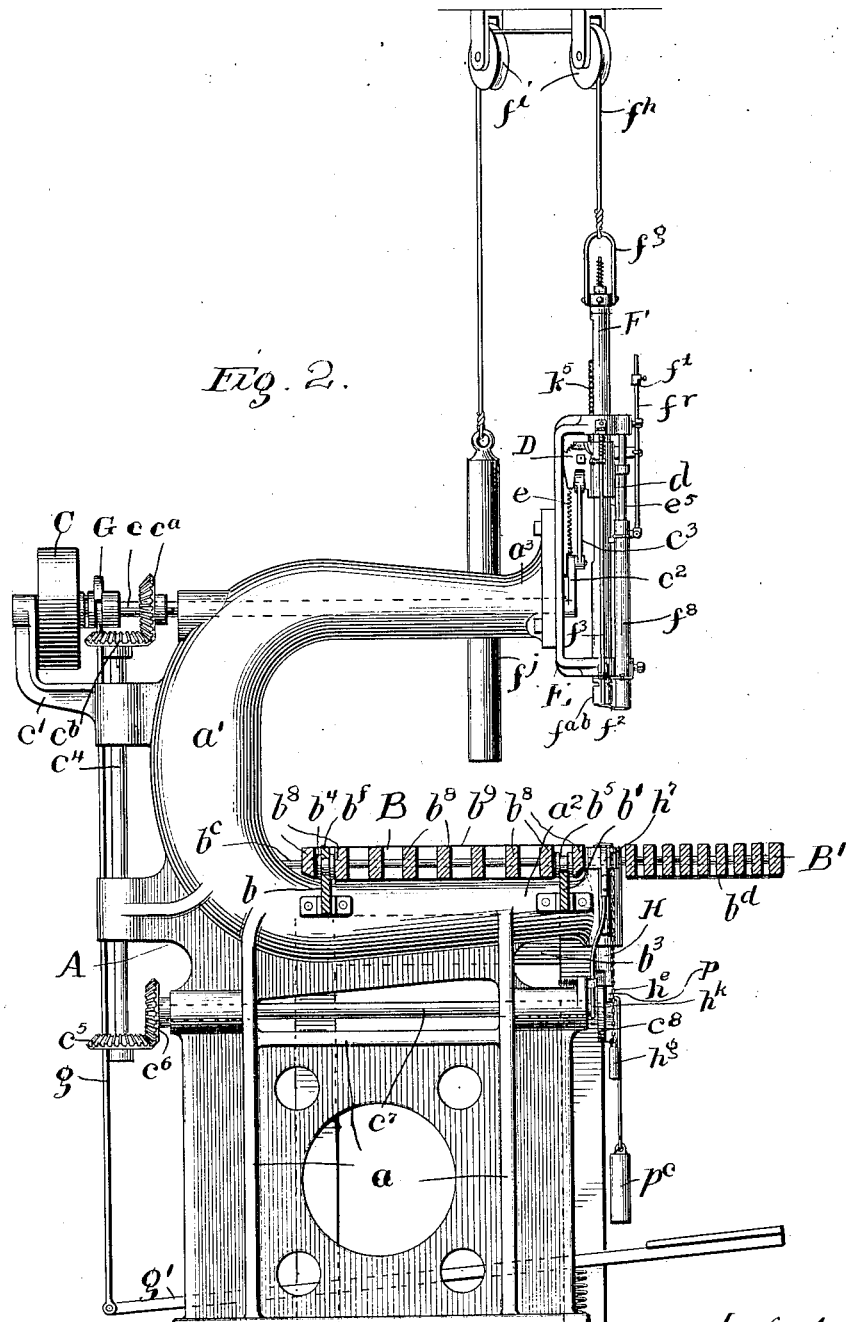

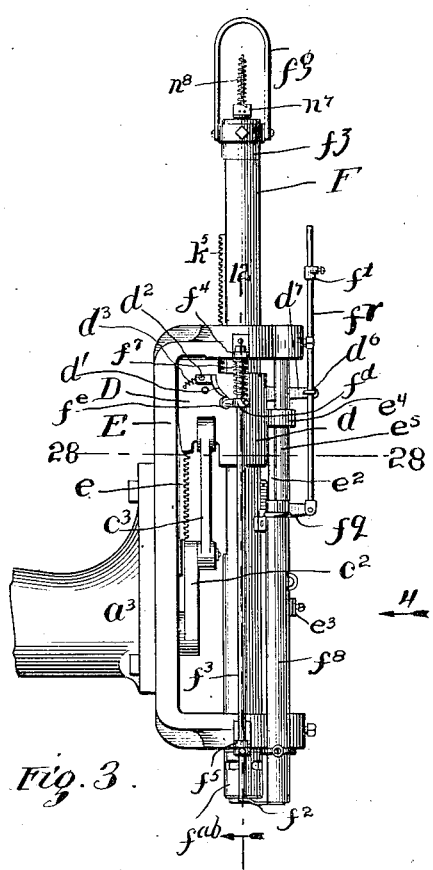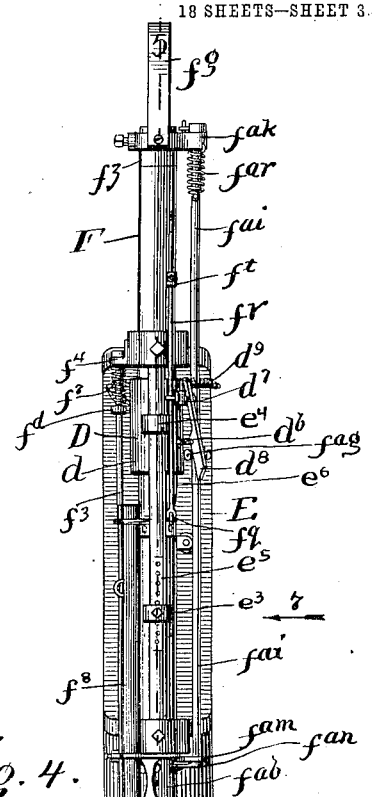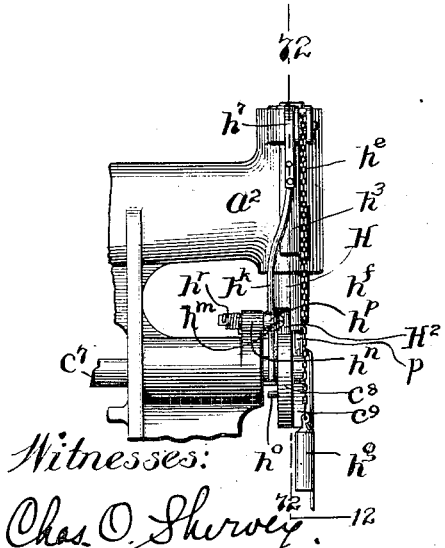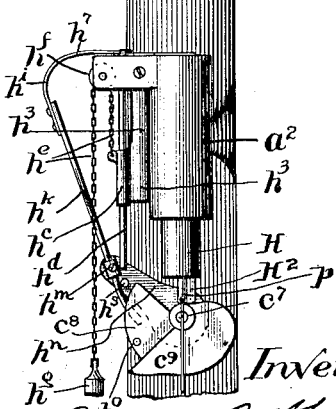

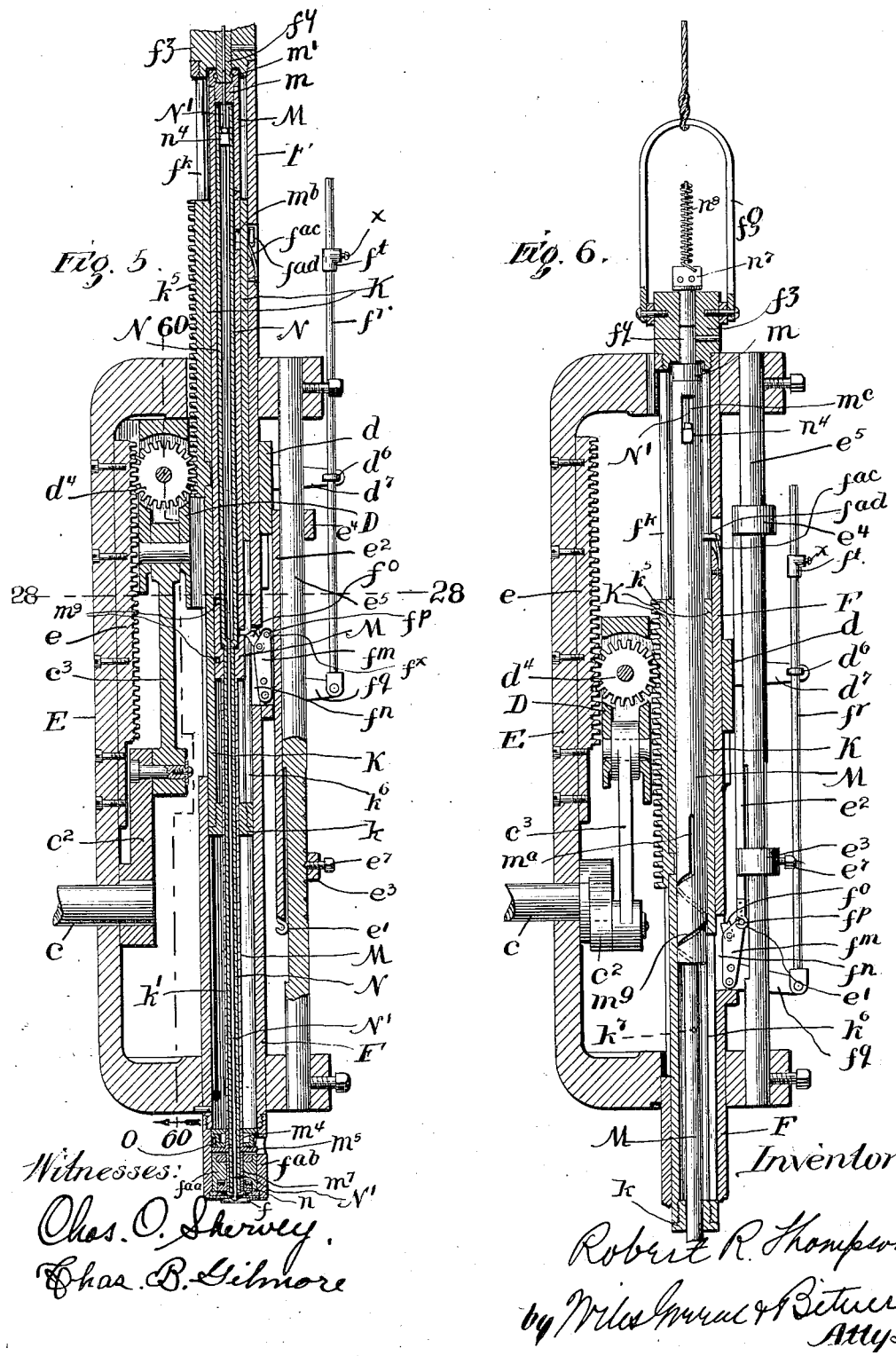

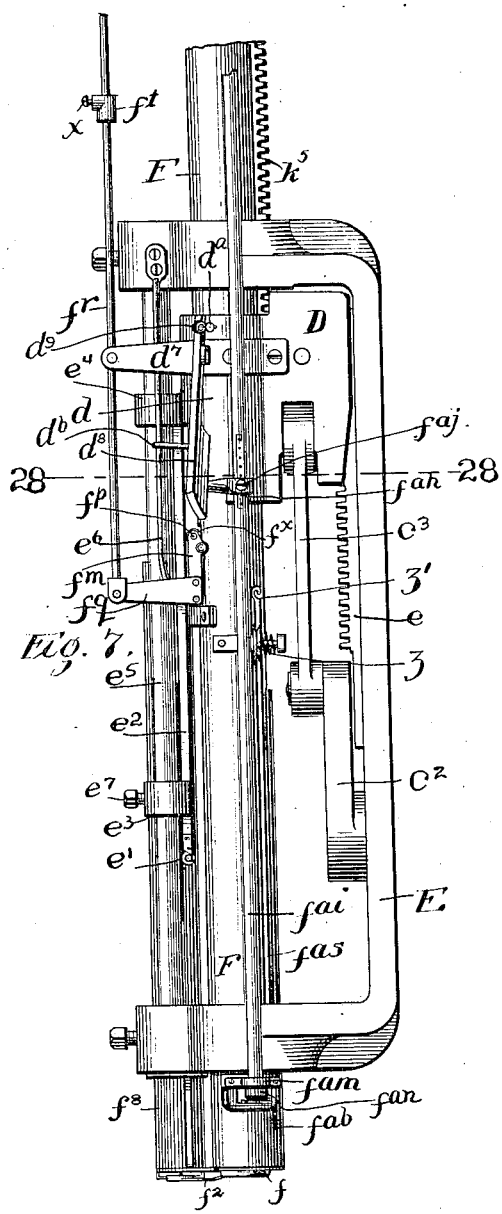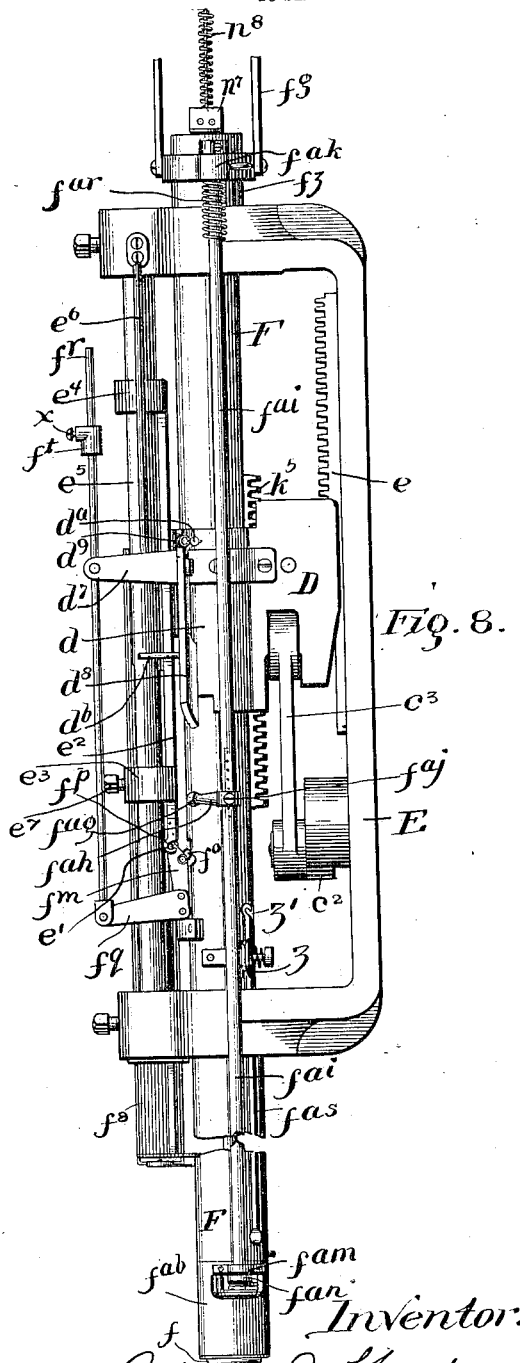

No. 819,952. PATENTED MAY 8, 1906.
R. R. THOMPSON.
MATTRESS TUFTING MACHINE.
APPLICATION FILED SEPT. 24, 1900.
18 SHEETS—SHEET 6.
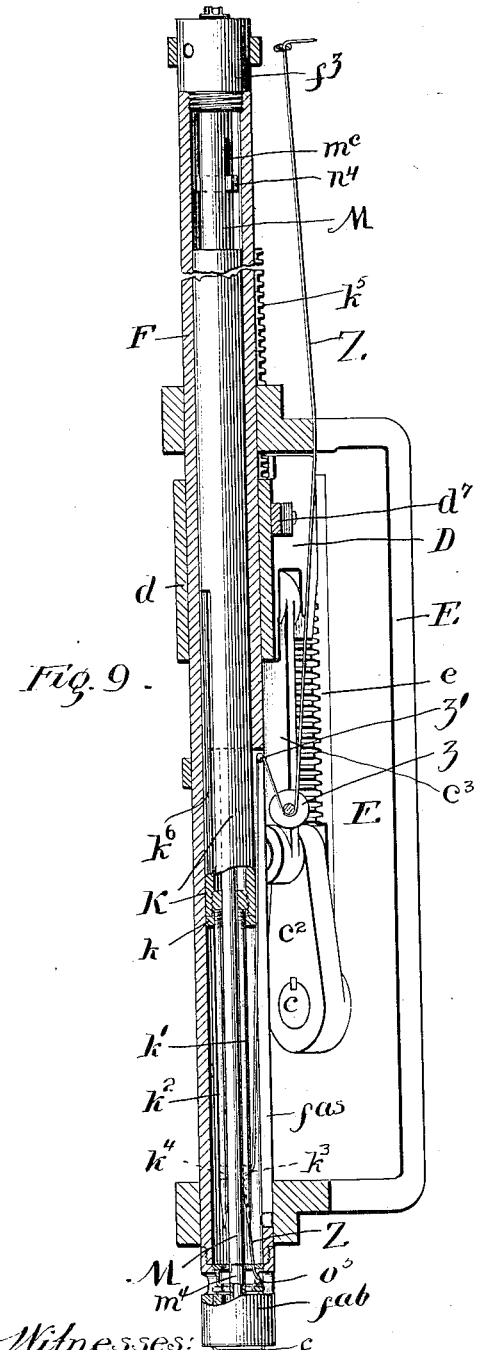
Fig. 9.
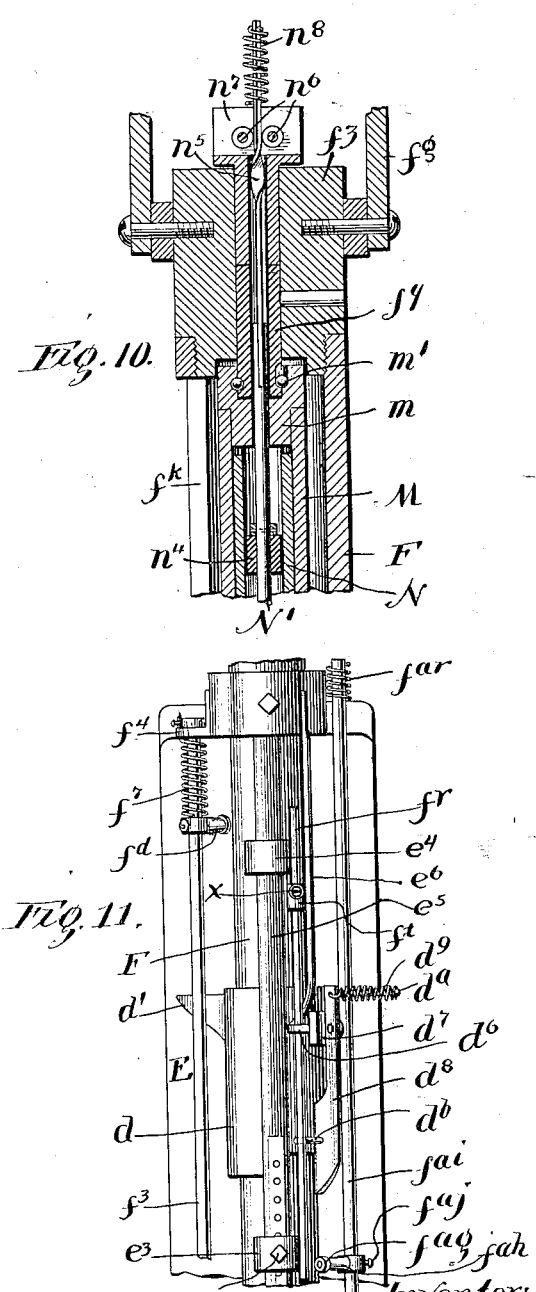
Fig. 10.
Fig. 11.
Witnesses:
Chas. O. Shewey.
Chas. B. Gilmore.
Inventor:
Robert R. Thompson,
by Wilks, Grue & Bitner,
Attys.

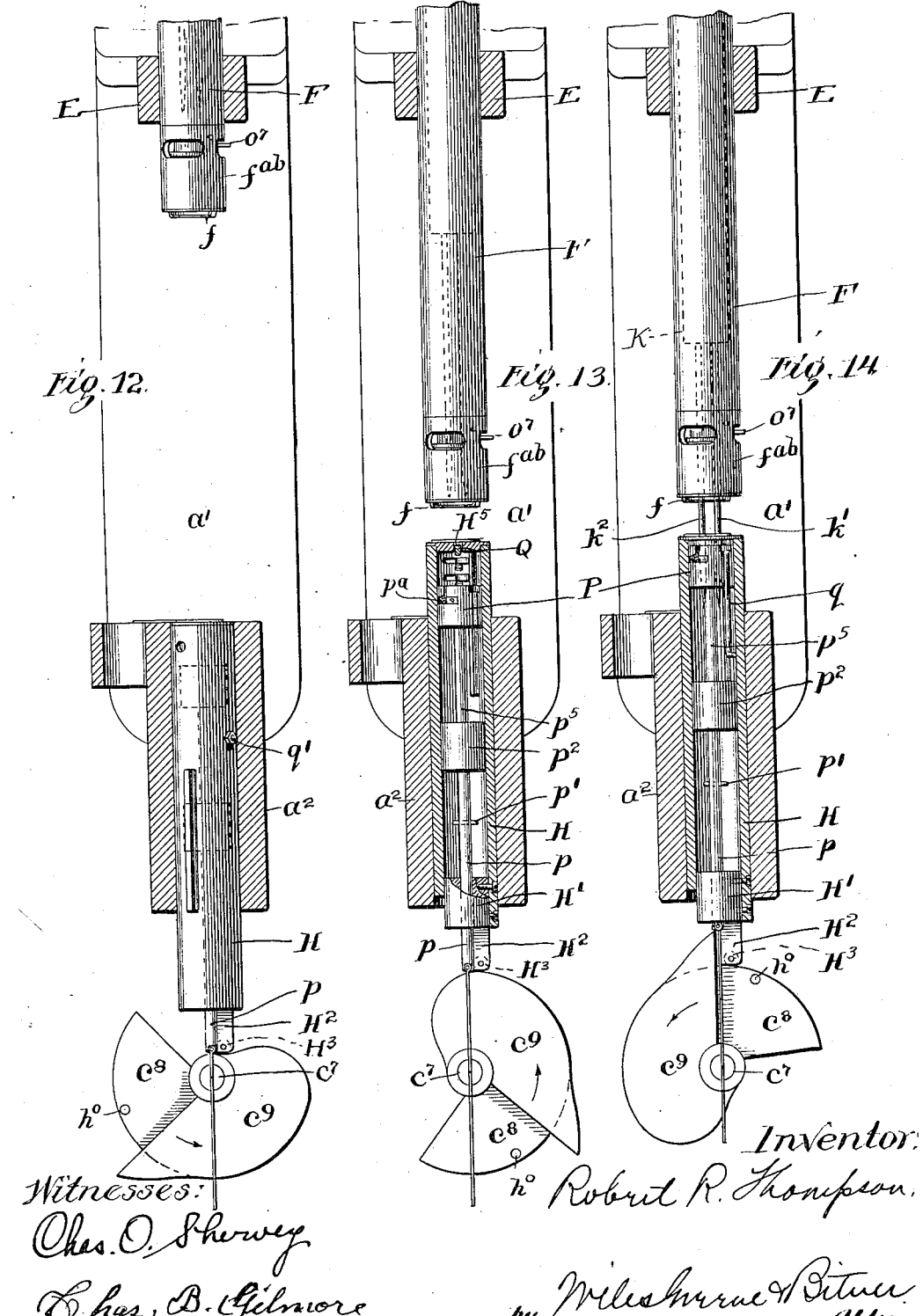

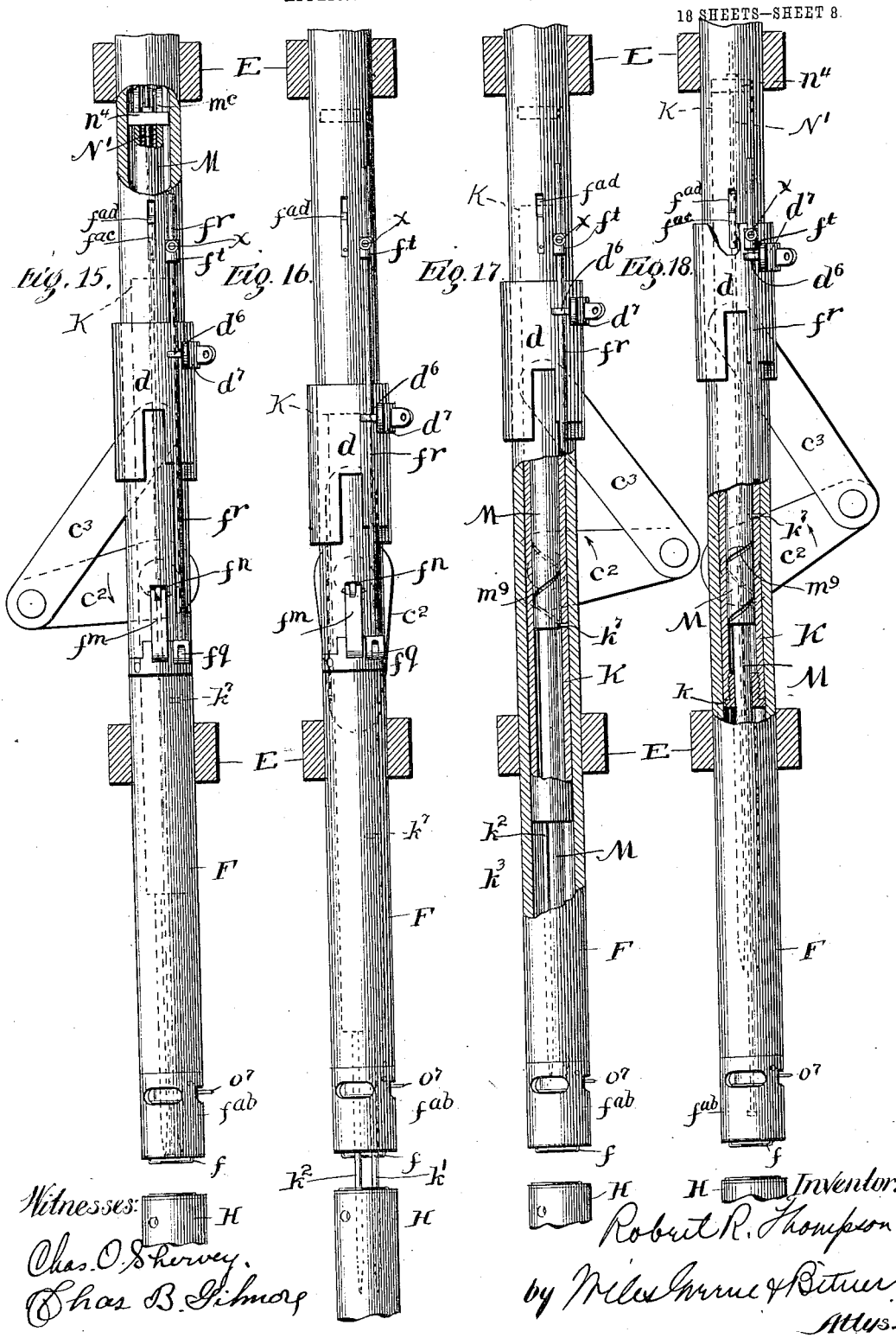

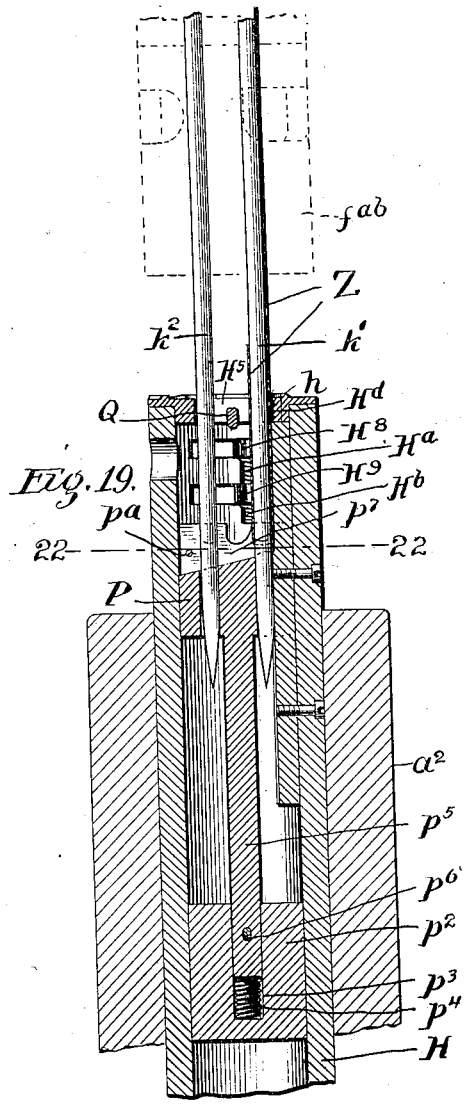
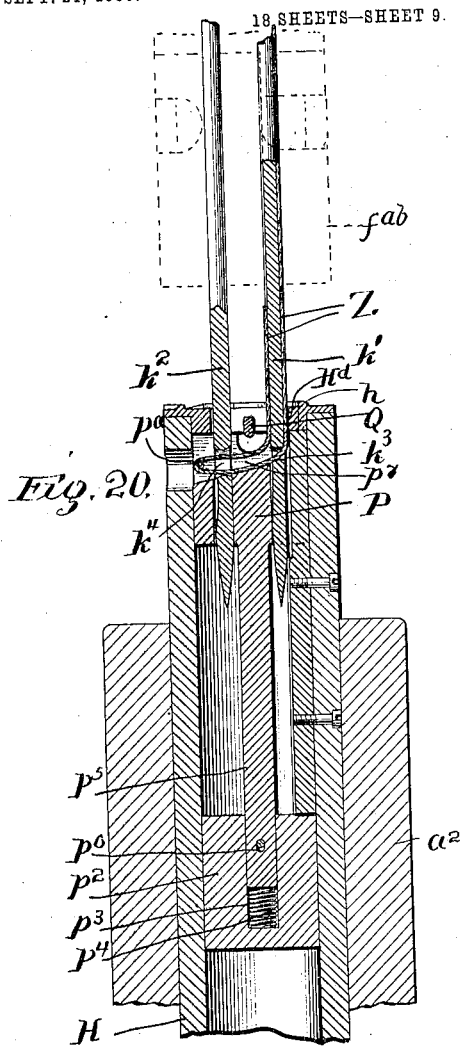
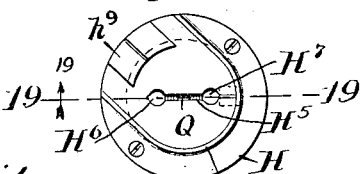
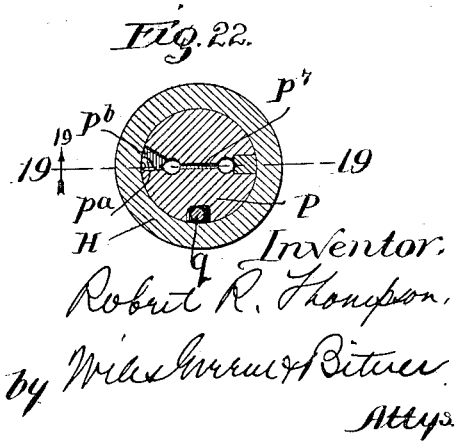

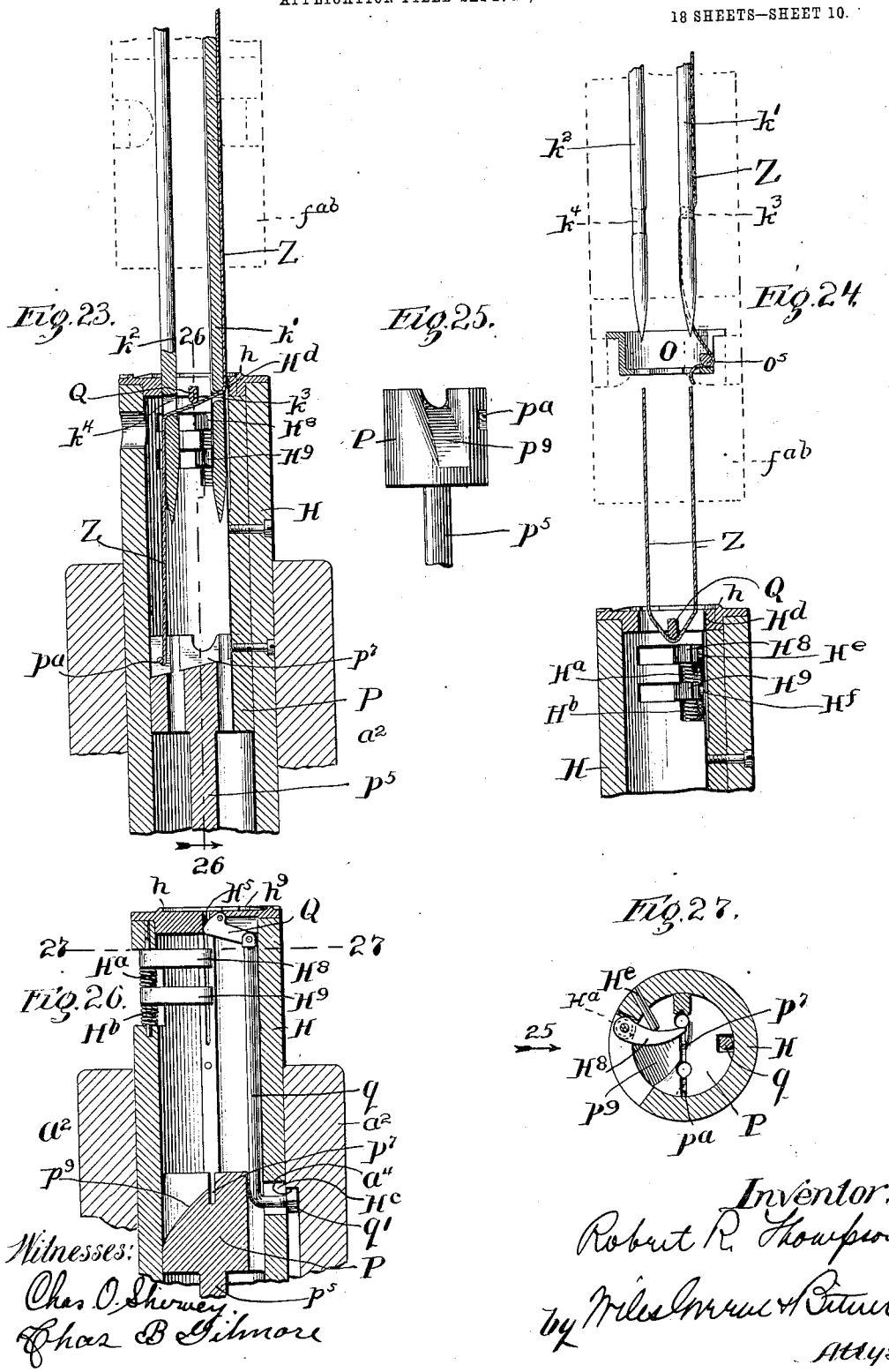

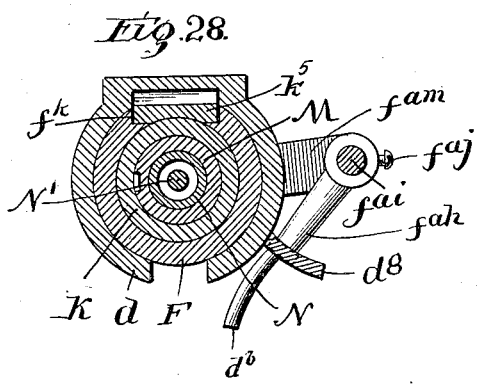
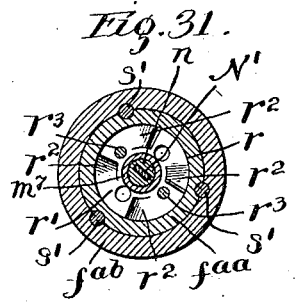
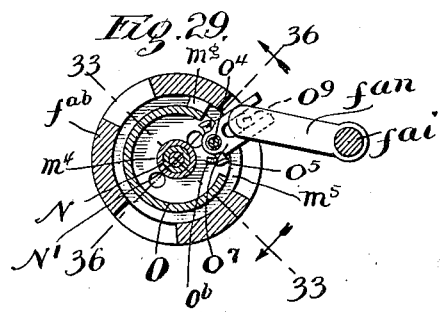
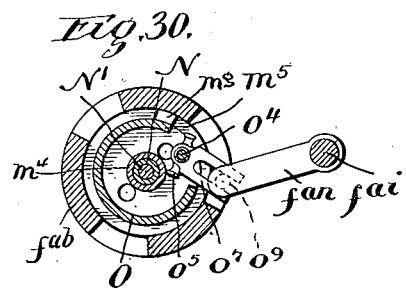
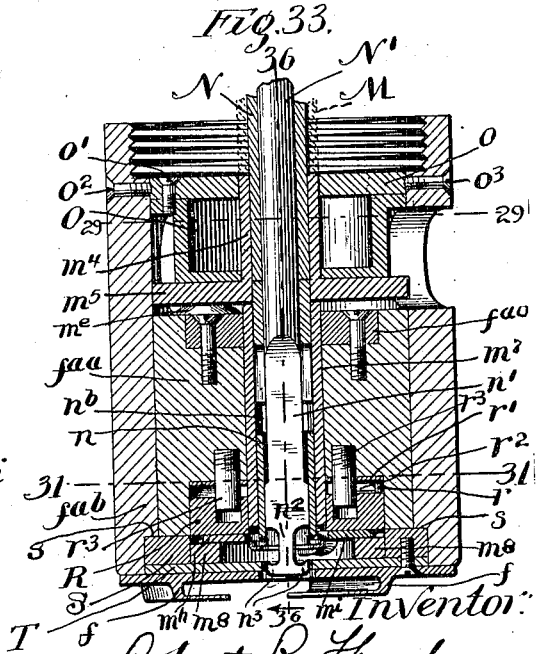

No. 819,952. PATENTED MAY 8, 1906.
R. R. THOMPSON.
MATTRESS TUFTING MACHINE.
APPLICATION FILED SEPT. 24, 1900.
18 SHEETS—SHEET 12.

Witnesses:
Chas. O. Shivvey.
Chas. B. Gilmore.

Inventor:
Robert R. Thompson
by Wills, Burrell & Pittner
Attys.

No. 819,952. PATENTED MAY 8, 1906.
R. R. THOMPSON.
MATTRESS TUFTING MACHINE.
APPLICATION FILED SEPT. 24, 1900.
18 SHEETS—SHEET 14.
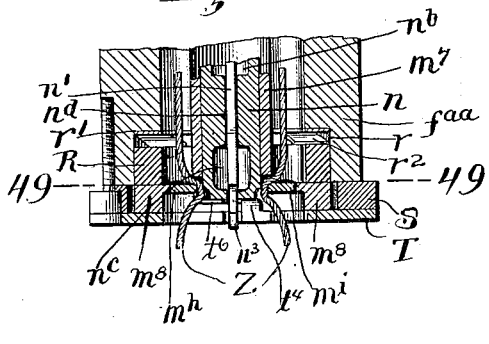
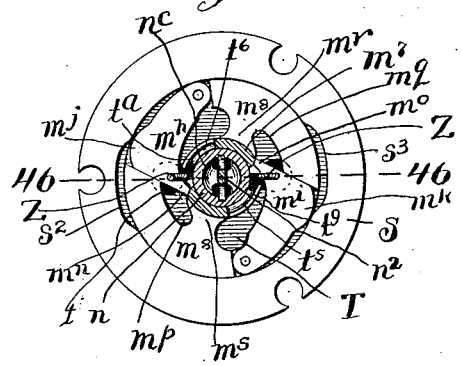
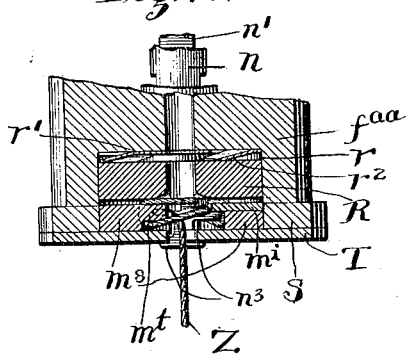
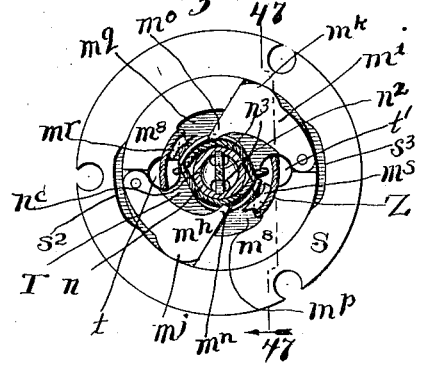
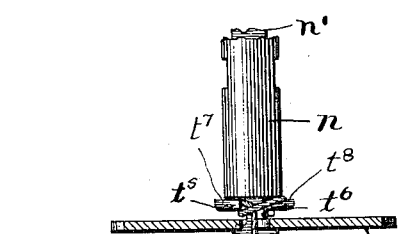
Witnesses:
Chas. O. Shewey
Chas B Gilmore
Inventor:
Robert R. Thompson
by Wilkinson & Fisher
Attys.

No. 819,952. PATENTED MAY 8, 1906.
R. R. THOMPSON.
MATTRESS TUFTING MACHINE.
APPLICATION FILED SEPT. 24, 1900.
18 SHEETS—SHEET 15.
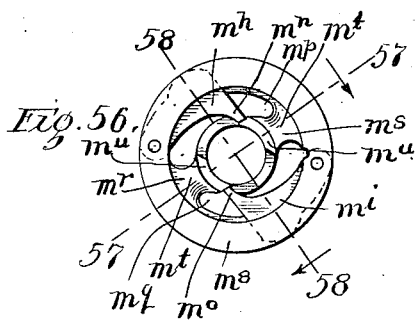
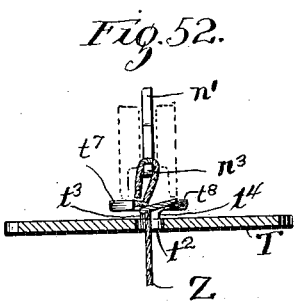
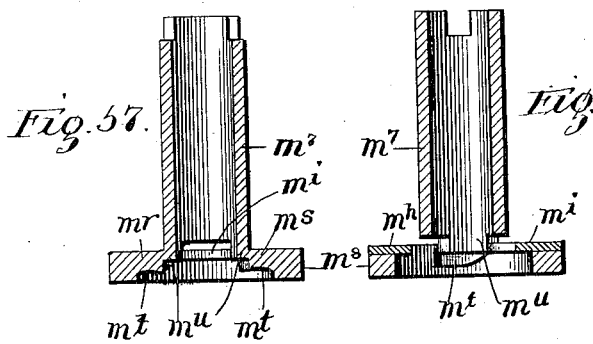
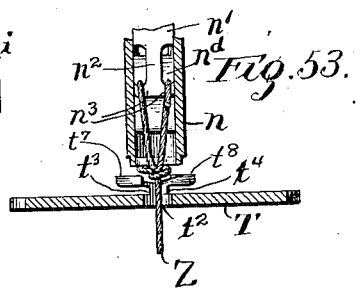
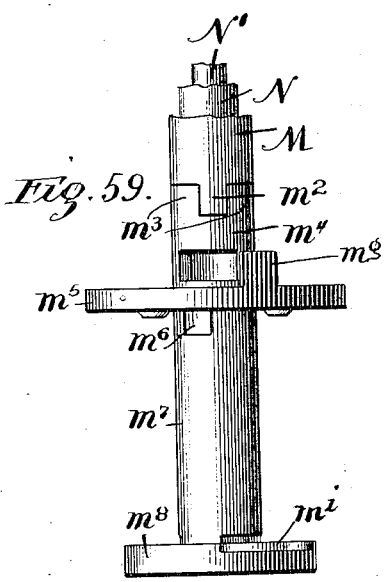
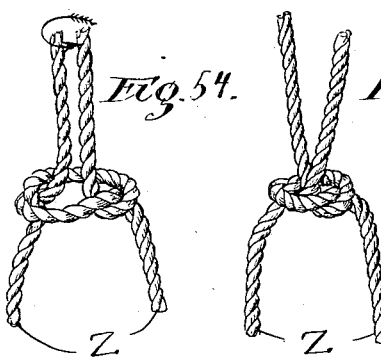
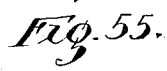
Witnesses:
Chas. O. Shurvey.
Chas. B. Gilmore.
Inventor:
Robert R. Thompson,
by Wiles Gurret & Bitner
Attys

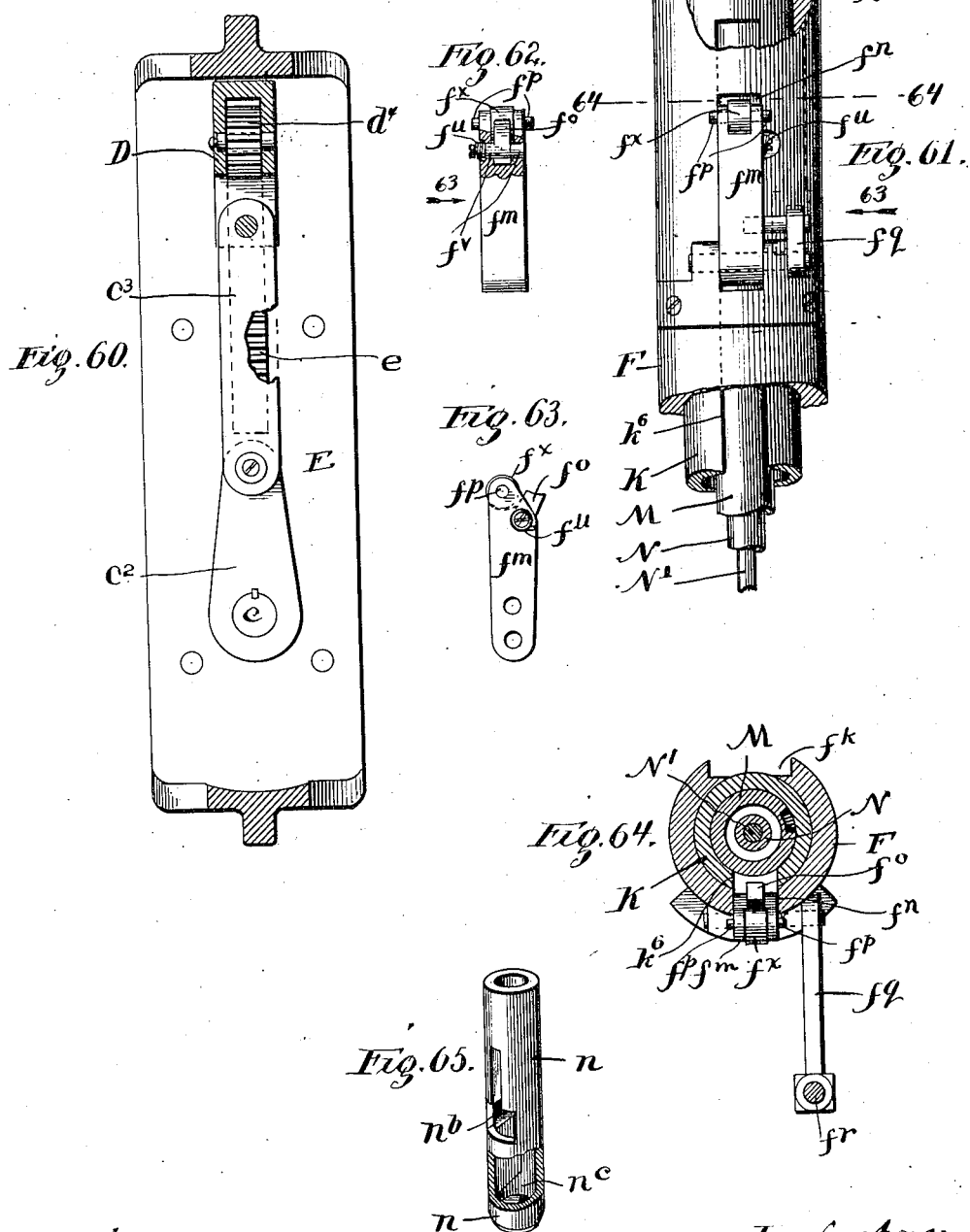

No. 819,952. PATENTED MAY 8, 1906.
R. R. THOMPSON.
MATTRESS TUFTING MACHINE.
APPLICATION FILED SEPT. 24, 1900.
18 SHEETS—SHEET 17.
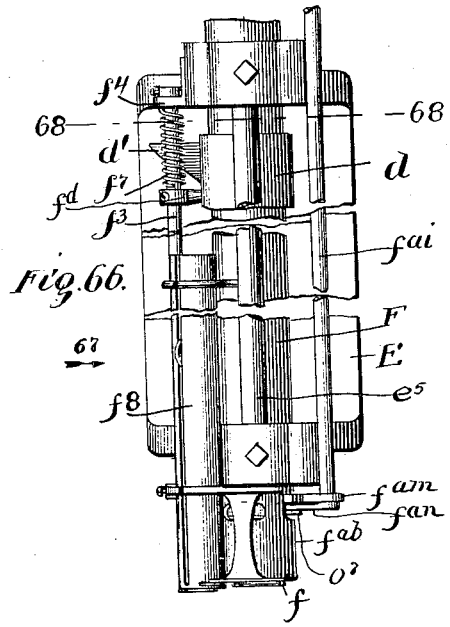
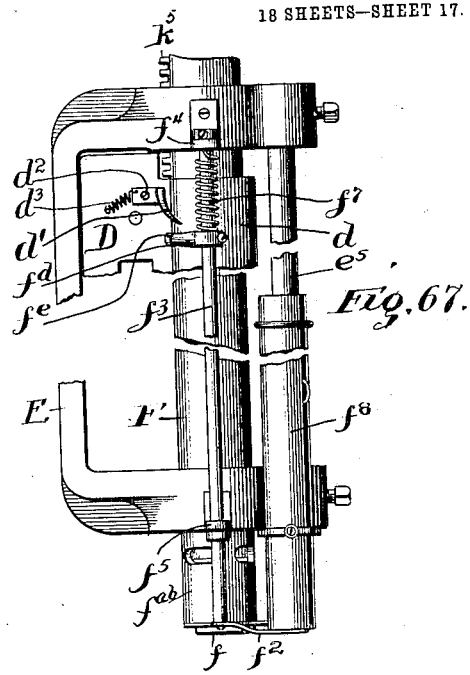
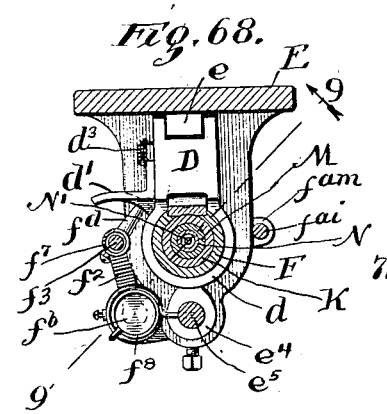
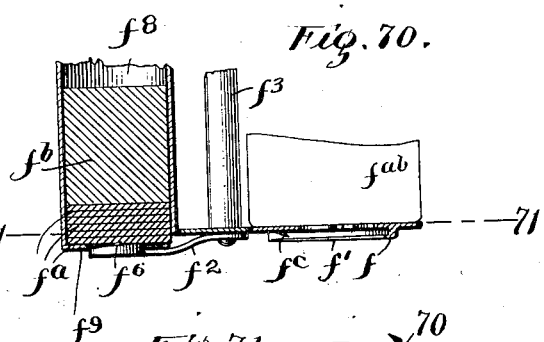
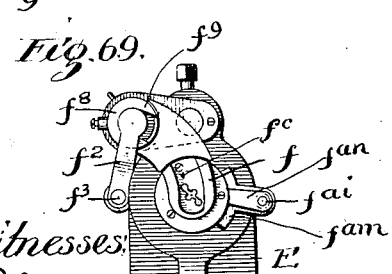
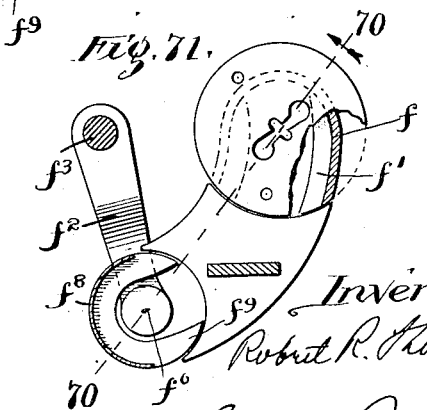
Witnesses:
Chas. O. Shurvey
Chas. B. Gilmore
Inventor:
Robert R. Thompson
by Miles Ivveal & Brun
Attys No. 819,952. PATENTED MAY 8, 1906.
R. R. THOMPSON.
MATTRESS TUFTING MACHINE.
APPLICATION FILED SEPT. 24, 1900.
18 SHEETS—SHEET 18.
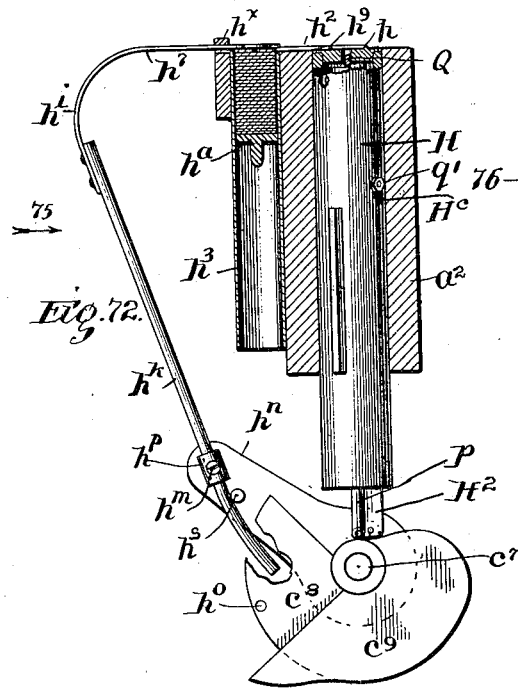
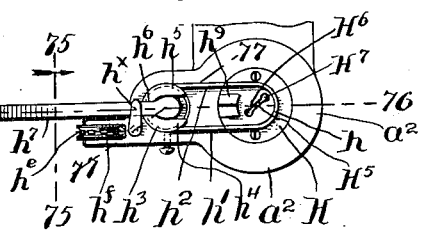
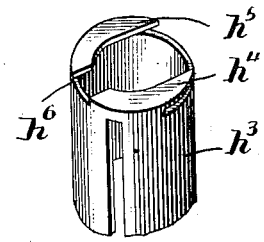
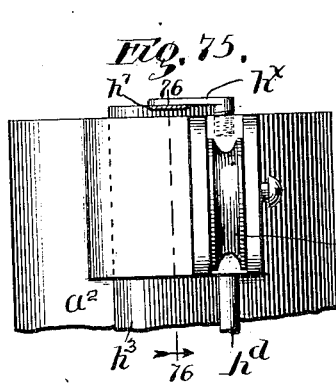
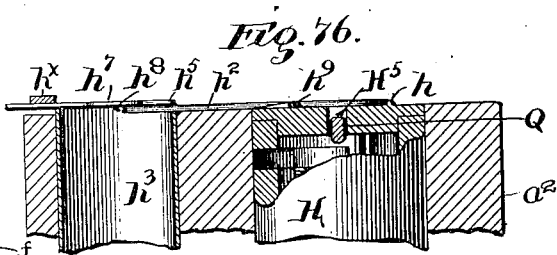
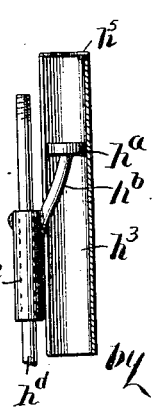

UNITED STATES PATENT OFFICE.

ROBERT R. THOMPSON, OF CHICAGO, ILLINOIS, ASSIGNOR, BY MESNE ASSIGNMENTS, TO UNITED MATTRESS MACHINERY COMPANY, A CORPORATION OF MAINE.

MATTRESS-TUFTING MACHINE.

No. 819,952.      Specification of Letters Patent.      Patented May 8, 1906.

Application filed September 24, 1900. Serial No. 30,913.

*To all whom it may concern:*

Be it known that I, ROBERT R. THOMPSON, a citizen of the United States of America, residing at Chicago, in the county of Cook and State of Illinois, have invented certain new and useful Improvements in Mattress-Tufting Machines, of which the following is a specification.

My invention relates to certain improvements in tufting-machines, the machine to which the invention has been particularly applied being a machine for tufting mattresses, and the object of the invention being to construct a machine which shall, by means of a single reciprocating movement of the operating parts, place the tufts upon both sides of the mattress, perforate the same, pass the twine through both tufts, and tie it to fasten the tufts together and confine the mattress between them.

It is a further object of the invention to make various minor and subordinate improvements in the mechanism and manner of arrangement of the various devices used therein.

To these ends the invention consists in certain novel mechanism, the specific details of which will be described at length below, and the essential features of which will be pointed out in the appended claims.

Figure 37:
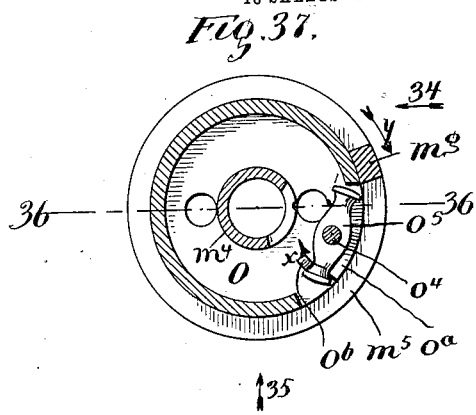
Figure 35:
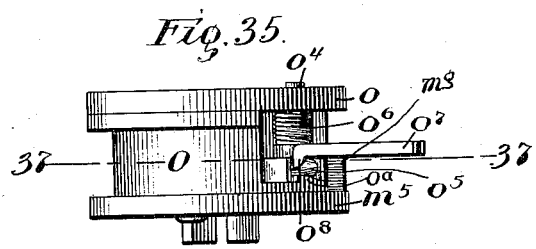
Figure 38:
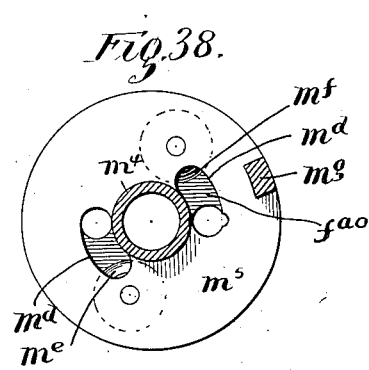
Figure 36:
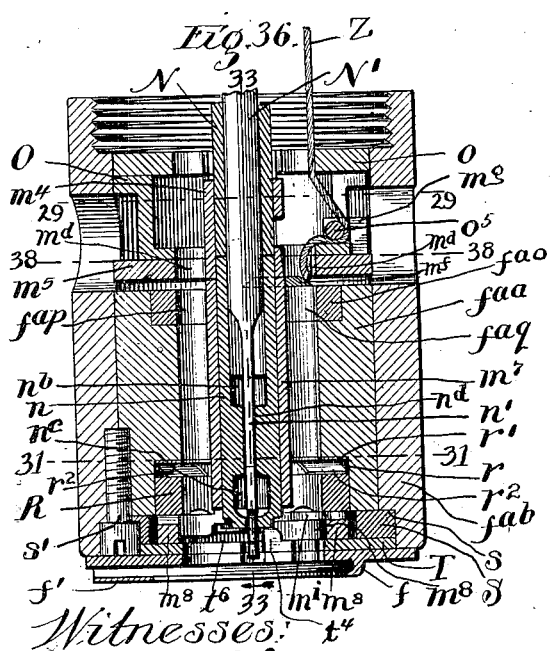
Figure 39:
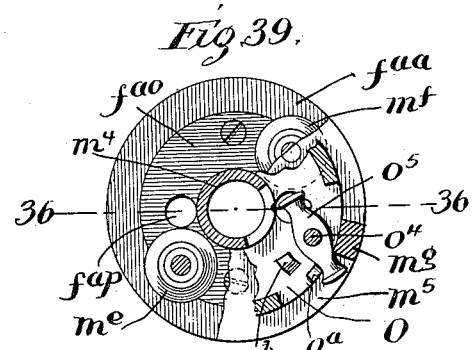
Figure 40:
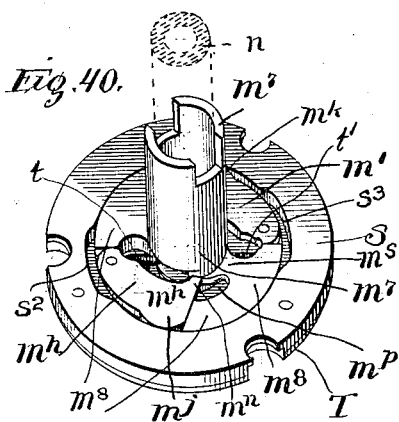
Figure 43:
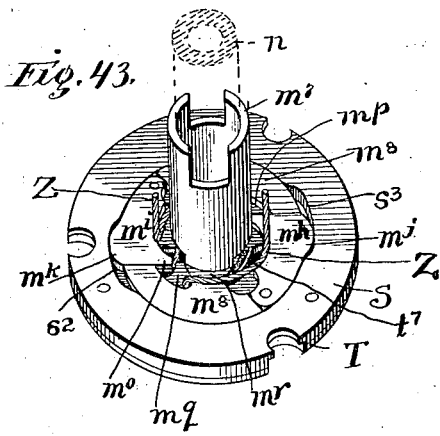
Figure 41:
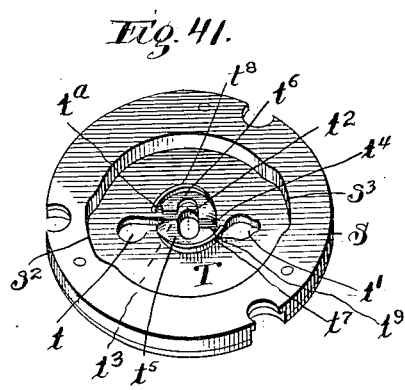
Figure 44:
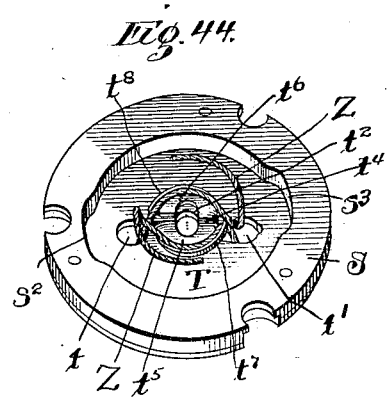
Figure 42:
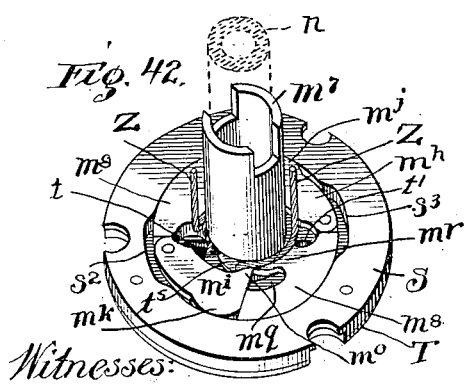
Figure 45:
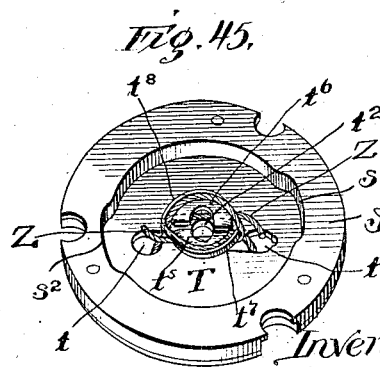

In the drawings, Figure 1 is a plan view of the machine with a part of the tracks broken away to permit the view to be as large as possible upon the sheet. Fig. 2 is a view partly in side elevation and partly in vertical cross-section, the line of section being taken at 2 2 of Fig. 1, and the view being in the direction of the arrow 2 in said figure. Fig. 3 is an enlarged side view of the upper and lower compressor-heads. Fig. 4 is a front view of the parts shown in Fig. 3, the view being in the direction indicated by the arrow 4 in Fig. 3. Fig. 5 is a central vertical section of the upper compressor-head, the line of section being taken at 5 5 in Figs. 1 and 4 and looking in the direction of the arrow 5. Fig. 6 is a view similar to Fig. 5, but showing the tube for rotating the knotter in side elevation, and the operating parts of the machine in a position at which the compressors have reached their limit of compression. Fig. 7 is a side view of the upper compressor-head with the compressor-tube parlty broken away, the view being in the direction indicated by the arrow 7 in Fig. 4. Fig. 8 is a view similar to Fig. 7, showing the operating parts in the same position as that shown in Fig. 6. Fig. 9 is a central vertical section through the upper compressor-head, showing the manner in which the machine is threaded, the line of section being indicated at 9 9 in Figs. 1 and 68 and in the direction by the arrow 9. Fig. 10 is an enlarged detail vertical section of the upper part of the compressor-tube, the section being taken in the line 5 5 of Fig. 4. Fig. 11 is a detail front elevation of the upper portion of the upper compressor-head, showing the devices for actuating one of the twine-holders, the position of the parts being the same as that shown in Figs. 6 and 8. Fig. 12 is a view, partly in front elevation and partly in vertical section, of a part of the frame, compressor-tubes, certain plungers in the lower compressor-tube, and certain cams actuating said plungers, the line of section being indicated at 12 12 in Fig. 3. Fig. 13 is a view similar to Fig. 12 with the lower compressor-tube also in section and showing the operating parts in the same position as that shown in Figs. 6, 8, and 11. Fig. 14 is a view similar to Fig. 13, showing the operating parts in the position occupied just as the loop has been thrown. Fig. 15 is a front view of a portion of the compressor-tubes and coacting parts, showing the same in the same position as that shown in Figs. 6, 8, 11, and 13. Fig. 16 is a similar view with the needles at their lowest position. Fig. 17 illustrates the same parts at a point where the tube for operating the knotter has become engaged to rotate and wrap the knot. Fig. 18 illustrates the same parts at a point where the knot has been wrapped and partially pulled tight. Fig. 19 is a detail vertical section of a portion of the lower compressor-head, taken in the line 19 19 in Figs. 1, 21, and 22 and looking in the direction indicated by the arrow 19, the needles having reached their lowest position, being a position corresponding to that shown in Fig. 16. Fig. 20 is a view similar to Fig. 19 with the operating parts in a position corresponding to that shown in Fig. 14. Fig. 21 is a detail end view of the upper end of the lower compressor-tube. Fig. 22 is a detail horizontal section in line 22 22 of Fig. 19. Fig. 23 is a view similar to Figs. 19 and 20, showing the loop-throwing plunger in the position after it has dropped and drawn the end of the cord through the eye of one of the needles. Fig. 24 is a view showing the needles as having reached a point immediately above the cutting-plate and the twine cut off to the proper length. Fig. 25 is a side view of the head of the loop-guiding plunger, the view being indicated by the arrow 25 in Fig. 27. Fig. 26 is a detail vertical cross-section through the upper portion of the lower compressor-head at right angles to that shown in Figs. 19, 20, 23, and 24, the line of section being taken at 26 26 in Fig. 23. Fig. 27 is a detail horizontal section in line 27 27 of Fig. 26. Fig. 28 is a detail horizontal section in line 28 28 of Figs. 3, 5, and 7. Fig. 29 is a detail horizontal section of the lower end of the upper compressor, taken in line 29 29 of Figs. 33 and 36, showing the twine-holder and devices for actuating the same. Fig. 30 is a similar view, but showing the parts in a different position—viz., that when the end of the twine has been released from the holder. Fig. 31 is a detail horizontal section taken in line 31 31 of Figs. 33 and 36, showing a tension-spring. Fig. 32 is an under plan of a tension-block. Fig. 33 is a detail vertical cross-section in line 33 33 of Figs. 29 and 36. Fig. 34 is a detail side elevation of the twine-holder, its supporting-plates, and the knife-carrying disk, the direction of the view being indicated by the arrow 34 in Fig. 37. Fig. 35 is a view of the same parts, taken at right angles to that seen in Fig. 34 and in the direction indicated by the arrow 35 in Fig. 37. Fig. 36 is a detail vertical cross-section of the lower end of the upper compressor-tube, the line of section being indicated at 36 36 in Figs. 29, 33, and 39. Fig. 37 is a detail horizontal section taken in line 37 37 of Fig. 35. Fig. 38 is a detail horizontal section taken at 38 38 in Fig. 36. Fig. 39 is a view similar to Fig. 37, showing the parts in a different position and certain portions broken away to show the knives and disk upon which they cut the twine. Fig. 40 is a perspective view of the knotter. Fig. 41 is a perspective view of the holders upon which the knot is wrapped and their supporting-disk. Fig. 42 is a perspective view of the knot-wrapper rotated one hundred and eighty degrees. Fig. 43 is a perspective view showing the knot-wrapper rotated about two hundred and fifty degrees. Fig. 44 is a view of the parts seen in Fig. 41, showing the twine as it appears when it has been wrapped half-way round. Fig. 45 is a similar view showing the twine when the wrapping operation has been completed. Fig. 46 is a detail vertical cross-section taken in the line 46 46 of Fig. 49. Fig. 47 is a detail vertical section taken in the line 47 47 of Fig. 50. Fig. 48 is a detail vertical section in line 48 48 of Fig. 51 with all of the parts removed except the knot-holders and disk, tension-tube, and tightener. Fig. 49 is a detail horizontal section in line 49 49 of Fig. 46, showing the knotter rotated about forty-five degrees and the dogs just engaging the twine. Fig. 50 is a similar view, but showing the knotter rotated three hundred and sixty degrees and in a position to pass the ends of the cord underneath the knot-holders, certain parts being broken away to show the holders, which would otherwise be hidden from view. Fig. 51 is a plan view of the holders and twine-hook after the knot has been wrapped and just before the hook closes the knot. Fig. 52 is a view similar to Fig. 48, showing the knot as having been partly drawn tight. Fig. 53 is a similar view showing the tension-tube also in section and the knot almost completed. Fig. 54 illustrates the knot in the position seen in Fig. 52. Fig. 55 illustrates the knot in the position seen in Fig. 53. Fig. 56 is an under plan of the knotter. Fig. 57 is a detail vertical cross-section of the same, taken in line 57 57 of Fig. 56. Fig. 58 is a similar view in line 58 58 of Fig. 56. Fig. 59 is a detail side elevation of the knotter, knife-carrying disk, and a portion of the tube for rotating the same, tubular weight, and hook-rod. Fig. 60 is a detail vertical cross-section taken in the line 60 60 of Fig. 5. Fig. 61 is a detail front elevation of a portion of the compressor-tube and other tubes within the same and showing a dog for limiting the downward movement of the compressor-rod. Fig. 62 is a rear view of said dog partly broken away. Fig. 63 is a side view of said dog looking in the direction of the arrow 63 in Fig. 61. Fig. 64 is a detail horizontal section taken in line 64 64 of Fig. 61. Fig. 65 is a detail perspective view of the knot-mandrel. Fig. 66 is a front view of a portion of the upper head, showing the means for placing the tufts for the upper face of the mattress. Fig. 67 is a side view of the parts seen in Fig. 66, the view being indicated by the arrow 67 in the latter figure. Fig. 68 is a horizontal section taken in line 68 68 of Fig. 66. Fig. 69 is an under plan of the parts seen in Fig. 66. Fig. 70 is a detail vertical cross-section taken in line 70 70 of Fig. 71. Fig. 71 is a detail horizontal section taken in line 71 71 of Fig. 70. Fig. 72 is a view, partly in side elevation and partly in vertical section, showing the means for placing the tufts for the lower face of the mattress, the line being indicated at 72 72 in Fig. 3. Fig. 73 is a plan view of the parts seen in Fig. 72. Fig. 74 is a perspective view of the lower tuft-reservoir. Fig. 75 is a side view of the parts seen in Fig. 73, the tuft-placing finger being cut away in line 75 75 of the latter figure. Fig. 76 is a vertical cross-section in the line 76 76 of Figs. 73 and 75. Fig. 77 is a vertical cross-section through the lower tuft-reservoir, taken in line 77 77 of Fig. 73 and showing the tuft-plunger in relation thereto and in side elevation, and Fig. 78 is a perspective view of one of the tufts.

The machine illustrated in the above drawings consists in general of, first, a framework provided with devices for supporting and handling a mattress; second, devices for compressing the mattress between them at any given point, the devices shown being termed "upper" and "lower" compressor-tubes; third, devices for feeding a tuft, such as is commonly used in tying or tufting mattresses, upon the bottom of the upper compressor-tube and upon the top of the lower compressor-tube prior to the motion of said tubes toward each other, which devices will be termed herein the "upper" and "lower" tuft-feeders; fourth, devices for passing a cord downward through both tufts and the intervening mattress and back again by a different path, which is accomplished in this machine by a pair of needles and certain auxiliary devices to handle and guide the cord; fifth, devices for cutting the cord just above the upper tuft, and, sixth, knotting devices to tie a knot between the two loose ends of the cord just above the upper tuft, completing the operation at this point. In connection with these general portions of the machine are various auxiliary devices necessary to their operation, which will be fully described in connection therewith.

The frame of the machine proper is shown at A, consisting of a suitable base portion resting upon the floor or other suitable support and braced by suitable ribs or flanges $a$. Above the base portion is supported a yoke-shaped, preferably hollow, portion $a'$, the forward lower end of which, $a^2$, together with the stationary parts secured thereto, we will call the "lower" compressor-head, and the forward upper end of which, $a^3$, together with its stationary parts, we will call the "upper" compressor-head. The lower portion of the yoke has secured to it the adjacent ends of a pair of longitudinal tracks $b\ b'$, the outer ends of which are supported by suitable legs $b^2\ b^3$. Upon these tracks travel rollers $b^4\ b^5\ b^6\ b^7$, journaled between contiguous members of a series of longitudinal bars $b^8$, forming a longitudinally-sliding table B. Cross-bars $b^9$ and end bars $b^a$ complete the framework of this table, and the longitudinal bars are perforated to receive laterally-sliding rods $b^b\ b^c$, supporting a lateral extension B' of the table B. The latter table is made up of a series of longitudinal bars connected by lazy-tongs $b^d\ b^e$, and the sliding rods are secured to the outer bar of the extension, so that as said bar is drawn away from the main table the intervening space may be filled by the separation of the other bars, the lazy-tong connection keeping said bars parallel and at equal distances from each other. This table, with its expansible extension, provides a support for the mattress, enabling any portion of the same to be brought between the compressor-heads. To prevent the forward or extensible portion of the table from tilting downward, an upper track $b^f$ is provided above the rollers $b^4\ b^6$, preventing the rear portion of the table from rising and allowing the forward portion to drop.

The operating parts of the machine are driven by means of a pulley C (see Fig. 1) upon a shaft $c$, journaled in a bracket $c'$ and in the upper portion of the yoke $a'$. Upon the forward end of the shaft is a crank-arm $c^2$, connected by a pitman $c^3$ with a vertically-reciprocating cross-head D, Fig. 3. To the end of the upper portion of the yoke is fastened a smaller yoke-shaped head-frame E, in which is guided a vertically-reciprocating upper compressor-tube F, which has upon its upper end a bail $f^g$, to which is attached a cord $f^h$, passing over pulleys $f^i$ and supporting a weight $f^j$, tending to hold the upper compressor in its highest position. At the proper time a needle-tube, to be described below, engages the compressor and forces it downward. The cross-head D has a collar-shaped portion $d$, encircling the upper compressor-tube, so that the cross-head is guided between said tube and the head-frame. The pulley C, Fig. 1, is loose on the shaft $c$ and engaged therewith by means of a clutch G, operated through a connecting-link $g$ by means of a foot-lever $g'$, extending to the front of the machine. The shaft $c$ also bears a miter-gear $c^a$ in mesh with a miter-gear $c^b$ upon a shaft $c^4$, bearing at its lower end a miter $c^5$, meshing with a miter $c^6$ upon a horizontal shaft $c^7$, journaled in the frame of the machine and extending to the forward portion of the same. Upon the forward end of this shaft $c^7$ are a pair of cams $c^8\ c^9$, Fig. 72, the use of which will be described below.

In the forward end of the lower portion $a^2$ of the yoke is guided the lower compressor-tube H, and the same is operated by means of an extension $H^2$, resting upon the rear cam $c^8$.

The upper tuft-feeder is shown on Sheet 17' Referring to this sheet, the lower end of the upper compressor-tube, which is shown in Fig. 69 in under plan, is provided with a U-shaped overhanging flange $f$, the overhanging lip $f'$ of which extends toward the interior of the U, forming a socket into which the tuft may be crowded and supported after the return of the feeding device. This feeding device, as shown, consists of a crank-arm $f^2$, supported and oscillated by an upright rod $f^3$, pivoted in brackets $f^4\ f^5$ upon the upper head-frame. The free end of the crank-arm is enlarged in the shape of a small disk, from the upper surface of which projects a "spur" or "spud," as it is termed, $f^6$. A coiled spring $f^7$ upon the rod swings the disk away from beneath the compressor-tube and brings it beneath an upper tuft-barrel $f^8$, within which the tufts are stacked one upon another and the lower end of which is provided with an inwardly-projecting lip or flange $f^9$, wide enough to keep the tufts from falling downward, but having an open center and side adapted to receive the disk-shaped portion of the crank-arm. The upper surface of this disk portion is raised above the adjacent portion of the crank-arm itself, so that the crank-arm may swing freely beneath the overhanging lip, while the disk extends upward sufficiently to engage the lower tuft in the upper tuft-barrel. The tufts are lettered $f^a$, and a weight $f^b$ rests upon them to crowd them downward. The oscillation of the arm slides the lower tuft from beneath the barrel and into the overhanging flange $f$. The spud $f^c$ on the disk is directed obliquely toward the compressor-tube, and a similar spud $f^c$ on the lower portion of the tube is arranged obliquely in the same direction, the result being that the spud on the disk engages the tuft to crowd it beneath the compressor-tube, but is withdrawn freely over the surface of the tuft in the return movement, the tuft itself being engaged and held securely by the spud $f^c$ on the tube. Upon the upper portion of the rod $f^3$ is a horizontal arm $f^d$, upon the outer end of which is a roller $f^e$, and the cross-head D has pivoted to it a cam-plate $d'$, which as the cross-head comes down engages the roller $f^e$ and oscillates the arm in the proper direction to place the tuft under the compressor-tube. The cam-plate $d'$ is pivoted to the cross-head at $d^2$ and has a spring $d^3$ tending to hold it in operative position, as seen in Fig. 67, the cam-plate being in contact with the collar portion of the cross-head in this position. Said cam-plate may, however, be forced away from this position as it passes the roller $f^e$ in returning upward to its original position.

The lower tuft-feeder is shown on Sheet 18. The lower compressor-tube H has upon its top, Fig. 73, a U-shaped guide $h$, from the ends of which guides $h'$ $h^2$ upon the frame extend to the top of a lower tuft-barrel $h^3$, secured to the frame and provided at its top with overhanging inwardly-projecting flanges $h^4$ $h^5$, between which a notch $h^6$ is provided to accommodate a tuft-feeding finger $h^7$, upon the end of which is a downwardly-projecting spud $h^8$, directed forward to crowd the tuft over the lower compressor-tube. A stop $h^9$ engages the rear side of the tuft when the latter is in position and prevents its return. The tufts in the lower barrel are held upward by a pusher $h^a$, carried by an arm $h^b$, projecting obliquely from a slide $h^c$, guided upon a vertical rod $h^d$, secured to the frame along the side of the tuft-barrel. The side of the tuft-barrel is slotted to accommodate the arm of the slide. The guide-rod $h^d$ is shown more clearly in Fig. 4 of Sheet 3, and the slide upon the rod is fastened to a chain $h^e$, running over a pulley $h^f$ and bearing upon the opposite side of said pulley a weight $h^g$, the gravity of which crowds the pusher $h^a$ constantly against the tufts. The tuft-feeding finger $h^7$ slides under a finger $h^x$, supported in the lower compressor-head and is curved downward at $h^i$ and secured to the end of a lever $h^k$, pivoted at $h^m$ between its ends to an arm $h^n$ of the frame and extending beyond its pivot into the path of a pin $h^o$, projecting backward from the cam $c^8$, the rotation of the cam bringing the pin at the proper moment against the lower end of the lever and crowding the feeding-finger forward to push the tuft over the lower compressor-tube. The lever $h^k$ is pivoted by means of a gudgeon $h^p$, (see lower portion of Fig. 3,) which also bears a coiled spring $h^r$, tending to withdraw the feeding-finger until the lower end of the lever $h^k$, Fig. 72, engages a stop-pin $h^s$ upon the arm $h^n$.

Inside of the upper compressor-tube F, Figs. 5 and 61, is a vertically-reciprocating needle-carrying tube K, in the lower end of which, Fig. 9, Sheet 6, is a perforated plug $k$, furnishing a thickened end in which is secured a pair of needles $k'$ $k^2$, having eyes $k^3$ $k^4$ near their points, the eye $k^4$ being somewhat elongated, as shown in Fig. 20 of Sheet 9. The needle-tube bears a rack $k^5$, extending through a slot $f^k$ in the upper compressor-tube and engaging a pinion $d^4$, journaled in the cross-head, also in mesh with a rack $e$, fast to the head-frame E. The movement of the cross-head operates through this gearing to move the needle-tube in the same direction and twice as fast as the cross-head. The needle-tube contains a slot $k^6$ to receive a dog $f^m$, Figs. 6, 61, 62, and 63, pivoted in a slot $f^n$ in the upper compressor-tube and provided with a pivoted finger $f^o$ to engage the top of the slot in the needle-tube, and with gudgeons $f^p$ to engage a hook $e'$, Figs. 5 and 6, on the end of a bar $e^2$, supported by collars $e^3$ $e^4$ upon a vertical rod $e^5$, fastened in the head-frame E. The dog $f^m$ has secured to it a laterally-extending arm $f^q$, upon the outer end of which is supported and pivoted a vertical rod $f^r$, guided in an eye $d^6$ on an arm $d^7$ upon the cross-head D. A vertically-adjustable collar $f^t$ on the rod is engaged by the eye at the proper time and releases the gudgeons from the hook. The dog is confined in its vertical movement by the bar $e^2$, which prevents it from swinging away from the compressor-tube until it reaches the hook $e'$, with which it is to engage. The pressure of the needle-tube upon the pivoted finger $f^o$, together with the gravity of the weight of the sliding rod $f^r$, tends to throw the dog outward into engagement with the hook, and the pivotal support of the finger enables the same to swing downward to avoid the friction which would be necessary to slide it out of the slot in the needle-bar. A spring $f^u$, Fig. 62, upon one of the two gudgeons $f^v$, which form the pivots of the finger, tends to raise the finger into the position seen in Figs. 62 and 63. A roller $f^x$ avoids unnecessary friction between the dog and the guiding-plate $e^2$.

Inside of the needle-tube is a rotary reciprocating tube M, Figs. 6 and 61, which also reciprocates vertically with the upper compressor-tube. The upper end of this rotating tube has a perforated plug $m$, Figs. 5 and 10, rotatably connected by a ball-bearing $m'$ with a tubular plug $f^y$, fastened in a cap $f^z$, secured in the top of the upper compressor-tube. The lower end of the rotating tube M, Figs. 5 and 59, is secured against relative rotation by ordinary clutch-teeth $m^2$ $m^3$ in a tubular rotating extension $m^4$, bearing a cutting-disk $m^5$, said extension being itself engaged against relative rotation by means of clutch-teeth $m^6$, with a second tubular extension $m^7$, bearing in its lower end a knot-wrapping disk $m^8$. These extensions are maintained in line with the rotating tube by parts within said tube and said extension, to be hereinafter described, and the weight of the tube and extensions is supported by the knot-holder plate, as will be seen when the knot-tying mechanism is described. The extension $m^7$ is journaled, Fig. 33, in a plug $f^{aa}$, secured in an extension $f^{ab}$, threaded to the lower end of the upper compressor-tube, Fig. 5.

The lower end of the rotating tube is reduced in size, as is clearly shown in Fig. 6, and the upper portion just above the reduced portion is provided with a spiral slot $m^9$, preferably passing once and a half around the tube and terminating in a longitudinal slot $m^a$. For engagement with this slot is a pin $k^7$ on the inside of the needle-tube, (dotted lines, Fig. 6, and full lines in Fig. 17 and 18,) and for the purpose of preventing rotation when the pin is below the slot said rotating tube is provided near its upper end with a slot $m^b$, Figs. 5 and 6, and a dog $f^{ad}$ is pivoted in the upper compressor-tube and drawn toward the slot in the rotating tube by a spring $f^{ac}$. The top of the needle-tube engages this dog and throws it out of the slot, as seen in Fig. 5, at the same time that the pin on the inside of the needle-tube enters the spiral slot in the rotating tube.

Inside of the rotating tube is a tubular weight N, Figs. 5 and 61, enlarged above and reduced below, which has a limited upward movement before it strikes the plug $m$ and the bottom of which rests upon a tubular knot-mandrel $n$, Figs. 33, 36, and 65, supported from below.

Inside of the tubular weight is a knot-tightening rod or bar N', Fig. 5, the lower end of which is flattened, as seen at $n'$, Figs. 33 and 36, and provided with a reduced shank $n^2$ and double hook $n^3$, as seen in the former figure. Upon the rod near its upper end, Figs. 10 and 15, is swiveled a cross-bar $n^4$, passing through slots $m^c$ in the rotating tube and projecting so as to be engaged by the top of the needle-tube K to raise the hook at the proper time to tighten the knot. The upper end of the rod is also flattened and twisted spirally at $n^5$, Fig. 10, and passes between rollers $n^6$, supported by a thimble $n^7$, fast in the top of the cap $f^z$. A pulling-spring $n^8$, secured to the top of the rod and to the thimble, draws the rod downward when permitted to do so by the lowering of the needle-tube.

Looking at Fig. 8, a cam-plate $d^8$ will be seen, tapered at its lower end toward the cylindrical portion of the cross-head and pivoted near its upper end to the arm $d^7$, so as to swing toward and from the cross-head. A spring $d^9$ pulls its upper end away from the cross-head, crowding the lower end against the same, the outer end of said spring being secured to a rod $d^a$, projecting from the cross-head. Slightly to one side of this cam-plate a rod $e^6$ is secured at its upper end to the head-frame and is bent inward at its lower end. A laterally-projecting pin $d^b$, secured in the cam-plate, rides on this rod to hold the cam-plate away from the cross-head when the latter is in the upper portion of its travel. When this cam-plate is pressed against the cross-head, it is in position to engage a roller $f^{ag}$ upon the end of an arm $f^{ah}$, fastened upon a rod $f^{ai}$ by means of a set-screw $f^{aj}$, the rod itself being rotatably held in a bearing $f^{ak}$ at the top of the compresser-tube and a second bearing $f^{am}$ at the bottom. The extreme lower end of this rod carries an arm $f^{an}$, Fig. 29, the oscillation of which serves to release the twine at a certain portion of the operation, as will be described hereinafter.

Looking now at Fig. 36, the plug $f^{aa}$ in the bottom of the extension $f^{ab}$ will be seen to have in the inside of its upper end a cylindrical rabbet-shaped groove containing a ring $f^{ao}$, which is hardened to serve as one of the cutting edges and which is perforated at $f^{ap}$ $f^{aq}$ to register with corresponding perforations in the plug and receive the needles as they pass downward into the mattress. Above this cutting-ring is located a cutting-disk $m^5$, above mentioned in connection with Fig. 59 and shown in plan in Fig. 38. This disk is slotted at $m^d$ $m^d$ to receive the needles and to have a limited movement with respect thereto and has upon its under side two circular knives $m^e$ $m^f$, that cut off the twine before the knot has been completed. This disk is rotated by the rotating tube at the proper moment, which is after the needles have been withdrawn above it, and the circular knives shear off the twine between them and the cutting-ring $f^{ao}$. Above the cutting-disk is a cylindrical cup O, Fig. 36, and upon this cup a cap $o$, perforated to receive the needles and the twine. The cup and cap are held together by a screw $o'$, Fig. 33, and the cap is held on the compressor extension $f^{ab}$ by means of two screws $o^2$ $o^3$, threaded in the extension and bearing upon the cap.

Looking at Fig. 34, a vertical pin $o^4$ will be seen secured in the bottom of the cup and in the cap, and upon the lower portion of this pin is pivoted between its ends a two-ended twine holder or clamp $o^5$, pressed downward by a coiled spring $o^6$, encircling the pin. The walls of the adjacent parts are cut away to enable this holder to turn completely around on the pin, and a pawl $o^7$, Figs. 34, 35, 29, 30, is pivoted upon the pin and has a depending finger $o^8$, adapted to engage with the holder and rotate it in the direction of the arrow $x$ in Fig. 37. The pawl extends outward, is longitudinally slotted at its outer end, and receives a pin $o^9$ on the end of the arm $f^{an}$. When this arm is oscillated by the cam on the cross-head, as above described, the twine-holder is rotated from the position shown in Fig. 29 to that shown in Fig. 30, and when the cam passes from beneath the roller $f^{ag}$ the twine-releasing rod is turned back to its initial position by means of a spring $f^{ar}$ (seen at the top of Fig. 8,) and secured to the rod and the compressor-top, respectively. Upon the bottom of the cup O, just to the right of the lower end of the twine-holder in Fig. 37, is an inclined stop $o^a$, up which the twine-holder rides while in the act of grasping the twine and behind which it is held to prevent a return movement. On the other side of the lower end of the twine-holder in the same figure is an inclined lug $o^b$, up which the twine-holder rides to release the twine and behind which it is held, with its opposite end in the path of an upwardly-projecting lug $m^g$, Figs. 37 and 38, on the knotter-disk, which is normally in the position seen in Fig. 37 and which moves in the direction of the arrow $y$ in said figure in the act of cutting the twine.

Fig. 39 shows the parts just after the knotter-disk has started and the instant before the twine is cut and clamped.

Turning to Sheets 7, 8, 9, and 10, which show the internal construction of the lower compressor and the working parts therein, the lower portion of the lower compressor, Figs. 13 and 14, is provided with a plug H′, from which depends the extension $H^2$, containing a roller $H^3$, bearing on the cam $c^8$, which, it should be noticed, to avoid confusion, coincides with the cam $c^9$ except as indicated by dotted lines across the point of the latter. The lower compressor is raised by this cam $c^8$ and returns by its own weight. Alongside of this extension the plug is bored to guide a vertically-reciprocating rod $p$, provided with a pin $p'$ to limit its downward movement and a head $p^2$, guided in the lower compressor-tube. The rod $p$ is eccentric to the compressor-tube and is in front of the sections in Figs. 19 and 20. Consequently it does not appear in those figures.

A vertical socket $p^3$ is provided in the center of the top of the head $p^2$, Fig. 19, containing a light coiled spring $p^4$, upon which rests a downwardly-extending stem $p^5$, bearing at its upper end a loop-guiding head P, a slot $p^6$ in the stem and a pin secured in the surrounding head $p^2$ giving the stem a slight downward movement against the tension of the spring. The head or loop-guide is slotted across the top at $p^7$, Fig. 22, and perforated to receive the needles, the loop being intended to pass from one needle to the other and to be drawn outward through the latter. A corresponding slot $H^5$, Fig. 21, is provided in the top of the lower compressor-tube and also needle-perforations $H^6$ $H^7$, registering with those in the loop-guide and in the upper compressor.

Looking at Figs. 26 and 27, the twine-holding fingers $H^8$ $H^9$ are supported upon vertical pivots and provided with springs $H^a$ $H^b$, pressing their free ends inward toward the path of the needle $k'$, so that these fingers may press upon the side of the needle and upon the twine along the same to hold the latter in place while the loop is being thrown through the eye of the other needle. The movement of these fingers toward the needle-opening is limited by two pins $H^e$ $H^f$, secured in the lower compressor-tube. The top of the loop-guide is cut away to provide an incline $p^9$, adapted to engage these fingers between their pivots and their bearing-points and withdraw them from the twine in succession as the loop enlarges and passes through the other needle. On the opposite side of the loop-guide is a hook $p^a$, extending across the slot $p^7$, which terminates in a recess $p^b$ on the other side of the slot, the portion of the hook on the side of the needle being tapered, so that the loop will pass outward over the point of the hook and spring behind the same by its own elasticity.

In the top of the lower compressor H, Fig. 26, is pivoted a dog Q, adapted to close the slot and hold the twine below it, as seen in Fig. 24, this position of the dog being shown in Fig. 26 also. The dog is operated by a rod $q$, pivoted to its end extending downward and bent outward through a slot $H^c$ in the compressor-tube and bearing without the latter a head $q'$, which is engaged by a shoulder $a^4$ of the frame when the compressor reaches its highest position to hold the dog, as seen in said Fig. 26.

Taking up the operation of the twine-handling devices thus far described, Fig. 9 shows the twine at Z, the same coming from a spool supported on the frame of the machine and not shown in the drawings, passing through an ordinary tension device $z$, supported upon the upper compressor, over a hook $z'$, also supported upon said upper compressor, down through a slot $f^{as}$ in the upper compressor, through the eye of the right-hand needle $k'$, and down under the twine-holder $o^5$. The end of the twine is clamped in said holder and held there as the needles pass downward through the mattress, drawing in sufficient twine to extend downward and back again and tie above the upper tuft. When this amount of twine has been drawn, which is just as the eyes of the needle pass into the lower compressor, the cam $d^8$ on the cross-head releases the twine-holder, and at the same time a series of teeth $H^d$, Fig. 20, on the lower compressor engage the twine on the right-hand side of the needle $k'$ to prevent further twine from being drawn from the spool. The needle continues, drawing downward with it the loose end of the twine until the position shown in Fig. 19 is reached, which is the lowest position of the needles. As the return movement starts the twine is held closely against the right-hand side of the needle $k'$ by the adjacent wall of the lower compressor, and the loose end is held against the left side by the fingers $H^8 H^9$, the result being that a loop is forced laterally from the needle $k'$ and guided by the loop-guiding head through the eye of the needle $k^2$, the latter position being seen in Fig. 20 and the fingers $H^8 H^9$ having been thrown backward from the twine as the upward movement progressed. The loop has also passed and engaged the hook $p^a$, and at this instant the rod $p$, Fig. 14, slides off of the point of the cam $c^9$, allowing the loop-guide to drop down into the position seen in Fig. 23, drawing the free end of the twine completely through the eye of the needle $k^2$. In this movement it is aided by a weight $p^c$, Fig. 2, connected to the lower end of the rod $p$. The upward movement of the needles continuing, the twine between them catches under the dog Q, Fig. 24, and while the right-hand needle rides up the main strand of the twine the left-hand needle draws the free end upward through the mattress, through the knotter to be described below, and into the lower end of the upper compressor-tube. This upward movement of the needles and the needle-tube, to which they are attached, brings the pin (shown at $k^7$, Fig. 6) into the spiral slot in the rotary tube, as seen in Fig. 17, and the further movement of the needle-tube rotates said rotary tube, turns the twine-cutting disk, severs the main strand of the twine, and at the same time catches said main strand in the twine-holder below the point of the needle $k'$ and above the cutter. This completes the operation of the sewing devices and leaves them in position for a repetition of the operation. It also leaves the ends of the twine projecting upward from the upper tuft into the knotter, to be operated upon by the latter.

The knotter, with the exception of the knot-mandrel $n$ and knot-hook $n^3$, together with their operating devices, is all contained in the extension $f^{ab}$ at the bottom of the upper compressor-tube and is located below the perforated plug $f^{aa}$, Figs. 33 and 36. In the lower portion of said plug is a cylindrical bore $r$ of greater diameter than the distance between the needles, in the top of which is a downwardly-pressing spring-plate $r'$, formed by stamping downward tongues $r^2$ from a thin annular plate of spring metal. This spring-plate presses upon a perforated tension and guiding block R, the bottom of which is shown in Fig. 32, said block being centrally perforated to accommodate the tubular stem $m^7$, Sheet 13, of the knot-wrapping disk $m^8$. The spring presses the tension-block down upon the knot-wrapping disk to hold the ends of the twine taut during the wrapping of the knot. Both the tension-block and the spring are held against angular movement by pins $r^3$. The disk itself is surrounded by a guide-ring S, held against a shoulder $s$, provided upon the inside of the compressor extension $f^{ab}$ by screws $s'$, which also serve to hold the plug $f^{aa}$ in the extension. The inner walls of this ring are cut away at $s^2 s^3$, Sheets 13 and 14, to form recesses, and the knot-wrapping disk has upon its upper surface two pivoted dogs $m^h m^i$, provided upon their outer edges with lugs $m^j m^k$, adapted to bear upon the inside of the ring and to enter the recesses and with points or teeth $m^n m^o$, adapted to swing inward and extend across two arc-shaped slots $m^p m^q$ in the knot-wrapping disk, forming extensions of the perforations through which the needles pass. The object of these dogs is to provide two distinct guides for each strand of the twine, so that during one porton of the wrapping the strands of the twine may be run over the points of the dogs, and during another portion of the wrapping the dogs may retire into the recesses $s^2 s^3$ and the twine run through the ends of the slots opposite the needle-perforations.

Looking at the bottom plan of the knot-wrapping disk in Fig. 56, it will be seen that the bridge portions $m^r m^s$, extending from the outer ring of the disk to the stem, are thicker vertically next to the ring at $m^t$ than next to the stem at $m^u$. This is also clearly shown in Figs. 57 and 58. In the wrapping of the knot the dogs direct the cord beneath the higher portions $m^u$ of these bridges, and as soon as the dogs release the twine and it slips into the ends of the slots it is directed beneath the lower or thicker portions, so that during the first portion of the wrapping the twine is carried around in a higher plane than during the latter portion.

Beneath the guide-ring is a knot-holding plate T, Sheets 13 and 14, perforated at $t t'$ to receive the needles at $t^2$ to allow the knot to pass through and slotted between the perforations, so that the twine and knot may pass out of the knotter after the knot is completed. Extending upward from opposite sides of the central perforation and also of the slot are two short posts $t^3$ $t^4$, Figs. 36 and 53, from the tops of which, Fig. 41, extend in opposite directions arc-shaped knot-holders $t^5$ $t^6$, provided with upwardly-directed outside marginal flanges $t^7$ $t^8$ and terminal notches $t^9$ $t^a$.

Looking at Figs. 33, 36, and 46, it will be seen that the knot-mandrel $n$ rests directly upon the inner portions of these knot-holders, the mandrel being provided to wrap the loop portion of the knot about prior to pulling the ends through it. The interior of the knot-mandrel is shown in Figs. 33, 36, and 65, and in its lower portion it contains a comparatively large chamber $n^c$, above which is a narrow slot $n^d$, fitted to the flat portion and merely providing space for the drawing of the twine through it tightly by the hook, it being desirable that as the hook passes through this portion the twine shall slip over the hook only with great difficulty, so that the knot may be drawn tight. Above this slot is a second larger portion or chamber $n^b$ of sufficient size to accommodate the twine easily and to allow it to slip freely from the hook, as the knot is completed before the hook reaches this chamber and it is desirable that the twine should draw outward freely after the completion of the knotting operation.

Returning to the operation of the machine, as previously described, it will be remembered that the twine was left as seen in Fig. 24, with the middle portion of the loop held by the dog Q and the end portions extending upward through the knotter and tension-block, as seen in Fig. 46. Just previous to this point in the operation the rotating tube N has been turned sufficiently to sever the main strand of the cord, the movement bringing the knot-wrapping disk into the position seen in Fig. 49, where the teeth of the dogs $m^h$ $m^i$ are coming into engagement with the cord or twine, and the further rotation of the knot-wrapper carries the twine around the lower end of the knot-mandrel on top of the knot-holders until the lugs $m^j$ $m^k$ reach the recesses $s^2$ $s^3$, at which point the dogs release the twine, and the continuation of the movement draws the twine into the ends $m^p$ $m^q$ of the slots in the knot-wrapping disk, drawing the twine beneath the thicker portions $m^t$ of the bridges $m^r$ $m^s$, as seen in Fig. 47, and guiding the cord as the rotation continues beneath the knot-holders, so that it is stretched across, Fig. 51, upon both sides of and immediately against the shank $n^2$ of the hook-rod above the hooks on the end of said rod. The knot is now in position for tying, and the rotation ceases at this point because the rotating pin $k^7$, Fig. 6, passes into the vertical portion $m^a$ of the slot in the rotating tube. The upward movement of the needle-tube continues, however, the top of the same striking the cross-bar $n^4$, Fig. 18, and lifting the hook-rod N' and the terminal hook and drawing the loose ends of the twine upward through the loop formed around the mandrel and into the interior of the mandrel. At the same time it should be noticed that the spiral twist in the hook-rod shown at the top of Fig. 10 turns said rod half-way around, carrying with it the knot-mandrel and turning the loose ends of the twine from the position shown in Fig. 54 to that shown in Fig. 55, carrying each past the other, so that as the knot tightens the loose ends are crossed and make a much more secure knot than one which is drawn tight from the position seen in Fig. 54. When the hook draws the ends of the twine through the narrow slot in the mandrel, the knot is drawn tight, as seen in Fig. 53, forcing the mandrel upward, and when the hook reaches the chamber above the slot the ends are released and the tying of the knot is completed. At this point the eye $d^6$, Figs. 6 and 18, on the arm $d^7$ of the cross-head has reached the stop $f^t$ on the vertical rod $f^r$, and its further movement releases the dog $f^m$ from the hook $e'$, allowing the upper compressor-tube to be lifted by the weight $f^j$, Fig. 2. At the same time the roller $H^3$, Fig. 14, runs off of the point of the cam $c^8$, allowing the lower compressor-tube to drop, which releases the dog Q, Sheet 10, and the middle loop of the twine, freeing the mattress from the machine, so that it may be moved to a second position for a repetition of the operation.

It should be noticed that the downward movement of the upper compressor may be adjusted by vertical movement of the hook $e'$, which, Fig. 6, is held in position by the plate $e^2$ and the collar $e^3$ clamped to the rod $e^5$ by a set-screw $e^7$. The changing of the extent of downward movement of the upper compressor necessitates the adjustment also of the stop $f^t$ on the rod $f^r$, which is effected by a set-screw $x$, (seen in the same figure.) It is also necessary to change the location of the arm $f^{ah}$, Fig. 8, on the rod $f^{ai}$, which is done by means of the set-screw $f^{aj}$.

Referring to Figs. 1 and 2, the clutch G is an ordinary stop-clutch, such as is used in punching-presses and various other machines where a single rotation is desired, and is engaged by the downward movement of the pedal, disengaging itself at the end of one revolution unless the pedal is held down.

In the complete description above given I have aimed to describe all of the details as accurately as has been thought necessary in order to make the construction perfectly clear and definite; but I do not intend by such description to limit my invention to any or all details or to any particular form or arrangement of the same, the essential characteristics of the invention being to a certain extent independent of the specific means selected in the preferred embodiment illustrated and described.

The knotter described herein as distinct and separate from the organized mattress-tufting machine is claimed in a divisional application executed by me upon the 21st day of October, 1901, said divisional application having been made in accordance with a requirement of the Commissioner of Patents.

I claim as new and desire to secure by Letters Patent—

1. The combination of compressing devices between which the work is compressed, means for carrying a length of thread through the work to form a loop at the point of compression, knotting mechanism, and means for operating the knotting mechanism to tie the knot at the point of compression before the work is released.

2. The combination of holding devices between which the work is held, means for carrying the thread through the work to form a loop, knotting mechanism, and means for operating the knotting mechanism to tie the knot close to the surface of the work before the work is released.

3. In a mattress-tufting machine, the combination with a frame, of suitable vertically-moving tufting and tying devices and a horizontal longitudinally-movable and laterally-extensible table slidingly supported upon the frame; substantially as described.

4. In a mattress-tufting machine, the combination with a compressor, having a tuft-holder on its end, of an adjacent tuft-holding barrel, a feeder reciprocating between the barrel and the holder to feed the tufts to the latter, a device upon the feeder engaging the tufts in a direction to crowd them to the holder and a device upon the holder engaging them in a direction to prevent their return; substantially as described.

5. In a mattress-tufting machine, the combination with a suitable compressor having upon its upper end, an overhanging flange adapted to receive and hold a tuft, of an adjacent tuft-barrel parallel with said compressor, a reciprocating member adapted to transfer tufts from said tuft-barrrel to said tuft-holder, a diagonally-inclined spine upon said reciprocating member extending in the direction of said tuft-holder, and means for removing a tuft from said spine and retaining it in said holder, substantially as described.

6. In a machine of the class described, the combination with a suitable framework and driving mechanism, of suitable twine-guiding and tuft-placing devices, devices for passing said twine through the tufts and the material to be tufted, devices for drawing said twine back through a different path, devices for knotting the two strands of twine thus formed, and devices for severing the twine on the side of the knot opposite the article to be tufted; substantially as described.

7. In a machine of the class described, the combination with a suitable frame and driving mechanism, of twine-guiding devices, devices for passing two substantially parallel strands of twine through the article to be tufted without changing the position of said article, said strands being connected upon one side of said article, devices for severing the twine, devices for forming, out of the ends thereof, a loop upon the opposite side of the article to be tufted, devices for drawing said ends through said loop and twisting them with respect thereto, and devices for drawing the loop tight about said ends, to form a knot; substantially as described.

8. In a machine of the class described, the combination with a suitable frame and driving mechanism, of twine-guiding devices, devices for passing two substantially parallel strands of twine through the article to be tufted without changing the position of said article, said strands being connected upon one side of said article, devices for cutting the twine, devices for forming out of the ends thereof, a loop upon the opposite side of the article to be tufted, devices for drawing said ends through said loop and rotating them about the axis of said loop, and devices for drawing the loop tight about said ends; substantially as described.

9. In a machine of the class described, the combination with a suitable framework and driving mechanism, of mechanism for placing a pair of tufts upon opposite sides of the article to be tufted, mechanism for forcing said tufts toward each other and pressing the article between them, twine-guiding devices, devices for passing said twine through both tufts, devices for drawing it backward through a different path through both tufts, devices for tying the two strands thus formed to fasten the tufts to the mattress and devices for severing the twine; substantially as described.

10. The combination, in a machine of the class described, with a suitable framework and driving mechanism, of compression devices to compress the article to be tufted, devices for feeding a pair of tufts respectively to the respective opposing faces of said compression devices, twine-guiding devices, devices for passing two substantially parallel strands of twine through said tufts and the intervening article without changing the position of said article, said strands being connected upon the outside of one of said tufts, devices for severing the twine, devices for forming out of the ends thereof, a loop outside of the other tuft, devices for drawing the ends of the twine through said loop and twisting them axially with respect to said loop, and devices for drawing the loop tight about said ends to form a knot; substantially as described.

11. In a machine of the class described, the combination with a suitable frame and driving mechanism, of a series of devices supported and operated thereby, consisting of compression devices adapted to compress between them the article to be tufted, devices for feeding a tuft to each of the opposing faces of said compression devices, prior to the compression, twine-guiding devices, devices for passing two substantially parallel strands of twine through both of said tufts and the intervening article without changing the position of said article, said strands being connected outside of one of said tufts, devices for severing the twine, devices for forming, out of the ends thereof, a loop outside of the other tuft, devices for drawing the ends of the twine through said loop and giving them a complete turn about each other in said loop, and devices for tightening the loop upon said ends to form a knot; substantially as described.

12. In a machine of the class described containing suitable means for tying the ends of the twine, the combination with a suitable frame and needle-supporting device reciprocating therein, of a pair of needles carried by said needle-support provided with eyes near their points and suitable twine guiding and handling devices adapted to carry the twine through the eye of one of said needles, whereby the reciprocation of the needles makes the necessary perforations and draws parallel strands of the twine through the needle-perforations in the work, said strands being connected by an intermediate portion of the twine upon one side of said work, and having their ends projecting from said perforations upon the opposite side thereof; substantially as described.

13. In a machine of the class described containing suitable means for tying the ends of the twine, the combination with a frame and needle-support, of a pair of parallel reciprocating needles carried by said support, provided with eyes near their points, twine guiding and holding devices adapted to keep one of the needles threaded, and means for threading the twine through the other after it has passed through the work and prior to its return, whereby the reciprocation of the needles perforates the work and draws two parallel strands of twine through the same, connected on one side and projecting from the other; substantially as described.

14. In a device of the class described containing suitable means for tying the ends of the twine, the combination with a frame and needle-support, of a pair of reciprocating parallel needles carried by said support, twine guiding and holding devices adapted to keep one needle threaded, devices for forming a loop in the thread beyond the eye of the threaded needle after both needles have passed through the work, devices for guiding said loop through the eye of the other needle, and devices for catching the loop and drawing the end of the twine through the eye of the latter, whereby one needle carries the twine through the work and the other needle brings the end of the twine back through the work by a different path; substantially as described.

15. In a device of the class described, the combination with suitable means for holding and compressing the mattress and a longitudinally-reciprocating threaded needle, of a longitudinally-reciprocating loop-guide which the needle enters and means for moving the loop-guide with the needle during a portion of its return, whereby the desired relation between the loop-guide and the eye of the needle is maintained during the throwing of the loop; substantially as described.

16. In a device of the class described, the combination with suitable means for holding and compressing the mattress and a longitudinally-reciprocating threaded needle, of loop-guiding devices which the needle enters, devices for holding the end of the twine adjacent to the eye of the needle, during the commencement of the looping operation, and devices for releasing the twine as it is required in the formation of the loop; substantially as described.

17. In a device of the class described, the combination with suitable means for holding and compressing the mattress and a longitudinally-reciprocating threaded needle having an eye near its point, of a longitudinally-reciprocating loop-guide which the needle enters, holding devices for holding the twine adjacent to the eye of the needle, means for moving the loop-guide with the needle during a portion of the return movement of the latter and devices for simultaneously releasing the twine adjacent to the eye as it is required in the formation of the loop; substantially as described.

18. In a device of the class described, the combination with suitable means for holding and compressing the mattress and two parallel longitudinally-reciprocating needles, one of which is normally threaded and both of which have eyes near their points, of a twine-holding finger yieldingly pressed against the side of the threaded needle to hold the free end of the twine against the same, and a longitudinally-reciprocating loop-guide which the needles enter, which returns with said needles during a part of their movement and drops away from said needles when the loop is formed, said loop-guide being provided with means for guiding a loop through the eye of the unthreaded needle, means for engaging the loop after it passes through the eye and means for releasing the holding-finger to free the twine along the threaded needle, as the loop approaches said finger; substantially as described.

19. In a machine of the class described, the combination with suitable means for holding and compressing the mattress and a longitudinally-reciprocating unthreaded needle having an eye near its point, of a threading device comprising a suitable guide in line with the eye of the needle and adapted to carry a loop through said eye and a hook arranged in the line of the guide, over which the loop passes by bending slightly and with which it engages by the elasticity of the twine; substantially as described.

20. In a device of the class described containing suitable means for tying the ends of the twine, the combination of a pair of longitudinally-reciprocating parallel needles, with eyes near their points, said needles being adapted to perforate the work and one of them to carry the twine through the same, devices for threading the twine through the other needle prior to the return movement and a device for engaging the twine between the two needles to hold it during the return of the needles; substantially as described.

21. In a device of the class described containing suitable means for tying the ends of the twine, the combination with a pair of longitudinally-reciprocating parallel needles having eyes near their points and being adapted to perforate the work and one of them to carry the twine through said work, of a work-compressor, which the needles enter after perforating the work, devices for passing the twine through the unthreaded needle within said compressor and a device also within said compressor operated by the movement of the same in compressing and releasing the work to engage the twine between two needles and hold it until released by the movement of the compressor away from the work; substantially as described.

22. In a device of the class described, the combination with a suitable head-frame and a suitable mattress-compressing head below said head-frame, of a longitudinally-reciprocating compressor guided in said head-frame, a longitudinally-reciprocating needle-support, also guided therein, means for reciprocating the needle-support and means for engaging the compressor with the needle-support during a portion of the movement of the latter and locking said compressor with respect to the frame during the remainder of the movement of the needle-support; substantially as described.

23. In a device of the class described, the combination with a suitable head-frame and a suitable mattress-compressing head below said head-frame, of a longitudinally-reciprocating compressor guided in said head-frame, a longitudinally-reciprocating needle-support guided within the compressor, means for reciprocating the needle-support and means for engaging it with the compressor during a portion of said movement; substantially as described.

24. In a device of the class described, the combination with a suitable head-frame, of a longitudinally-reciprocating compressor guided therein, a longitudinally-reciprocating needle-support guided within the compressor, means for reciprocating the needle-support and for carrying the compressor with it during a portion of its movement, means for locking the compressor after the compression is completed, a knotter supported in the end of the compressor and a device for operating said knotter longitudinally guided within the needle-support and rotatably guided in the compressor and coöperating means upon the said device and upon the needle-support for rotating the knotter by the reciprocation of said needle-support; substantially as described.

25. In a device of the class described, the combination with a suitable head-frame, of a longitudinally-reciprocating compressor guided therein, a longitudinally-reciprocating tubular needle-support guided in the compressor, a knotter supported in the end of the compressor, a tubular rotating device for operating said knotter longitudinally guided in the needle-support and rotatively guided in the compressor and a knot-tightener having a stem longitudinally guided within the rotating device, and means for engaging the needle-support and the knot-tightener to operate the latter by the reciprocation of the former; substantially as described.

26. In a device of the class described, the combination with a suitable head-frame, of a longitudinally-reciprocating compressor guided therein, a longitudinally-reciprocating tubular needle-support guided in the compressor, a knotter supported in the end of the compressor, a tubular rotating device for rotating said knotter longitudinally guided in the needle-support and rotatively guided in the compressor and a knot-tightener having a stem longitudinally guided within the rotating device, means for engaging the needle-support and the knot-tightener to operate the latter by the reciprocation of the former, and means for engaging the compressor with the needle-tube to effect the compression; substantially as described.

27. In a device of the class described, the combination with a suitable head-frame, of a longitudinally-reciprocating compressor guided therein, a longitudinally-reciprocating tubular needle-support guided in the compressor, a knotter supported in the end of the compressor, a tubular rotating device for operating said knotter longitudinally guided in the needle-support and rotatively guided in the compressor and a knot-tightener having a stem longitudinally guided within the rotating device, means for engaging the needle-support and the knot-tightener to operate the latter by the reciprocation of the former, and coöperating means upon the rotating device and the needle-support for effecting the rotation of said device by the reciprocation of the support; substantially as described.

28. In a device of the class described, the combination with a suitable head-frame, of a longitudinally-reciprocating compressor guided therein, a longitudinally-reciprocating tubular needle-support guided in the compressor, a knotter supported in the end of the compressor, a tubular rotating device for operating said knotter longitudinally guided in the needle-support and rotatively guided in the compressor and a knot-tightener having a stem longitudinally guided within the rotating device, means for engaging the needle-support and the knot-tightener to operate the latter by the reciprocation of the former, coöperating means upon the rotating device and the needle-support for effecting the rotation of said device by the reciprocation of the support, and means for engaging the compressor with the needle-tube to effect the compression; substantially as described.

29. In a device of the class described, the combination with a suitable head-frame and a suitable mattress-compressing head below said head-frame, of a reciprocating cross-head guided in said head-frame, a longitudinally-reciprocating compressor also guided therein, a longitudinally-reciprocating needle-support guided in the compressor, connections between the cross-head and the needle-support for reciprocating said support, connections between the needle-support and the compressor for operating the compressor, devices for releasing the compressor from the needle-support at the end of the compression, devices for locking said compressor with respect to the frame, and devices actuated by the cross-head for releasing the compressor from the frame and permitting the same to reëngage the needle-support; substantially as described.

30. In a mattress-tufting machine, the combination with a suitable frame and driving mechanism, of devices for compressing the mattress, devices for passing two parallel strands of cord through the mattress, connected on one side thereof, devices for knotting the ends of the cord on the other side thereof and devices for holding and maintaining a tension upon said ends throughout the knotting operation; substantially as described.

31. In a device of the class described, the combination with suitable devices for compressing the article to be operated upon, and devices for passing two strands of twine through the article to be operated upon, of means for forming a loop from the ends of the twine, yielding means for holding the loop in position, means for drawing the ends of the twine through the loop, and means for tightening the loop prior to the release of the article to be operated upon.

32. The combination with two needles constructed and arranged to carry two separated strands of thread through a mattress and mechanism for reciprocating said needles, of thread-carriers arranged to receive the separated ends of said strands, a knotter-tube, means for operating said carriers to wrap the thread about said knotter-tube, and means for completing the knot.

33. In a mattress-tufting machine, the combination with a suitable frame and driving mechanism, of devices for compressing the mattress, devices for passing two parallel separated strands of cord through the mattress, connected on one side thereof, devices for knotting the ends of the cord on the other side thereof and devices for holding and maintaining a tension upon said ends throughout the knotting operation.

In witness whereof I have hereunto set my hand, at Chicago, in the county of Cook and State of Illinois, this 13th day of August, A. D. 1900.

ROBERT R. THOMPSON.

Witnesses:
   CHAS. O. SHERVEY,
   CHAS. B. GILMORE.